United States Patent [19]

Sashiki et al.

[11] Patent Number: 4,618,011

[45] Date of Patent: Oct. 21, 1986

[54] COMBINATORIAL WEIGHING METHOD WITH PAIRS OF SCALES AND ZERO ADJUSTMENT

[75] Inventors: Takashi Sashiki, Nagaokakyo; Yukio Nakagawa, Kyoto, both of Japan

[73] Assignee: Ishida Scales Mfg. Co., Ltd., Kyoto, Japan

[21] Appl. No.: 720,308

[22] Filed: Apr. 5, 1985

[30] Foreign Application Priority Data

Apr. 5, 1984 [JP] Japan .................................. 59-68288
Apr. 5, 1984 [JP] Japan .................................. 59-68289
Apr. 5, 1984 [JP] Japan .................................. 59-68290

[51] Int. Cl.⁴ ...................... G01G 19/22; G01G 13/14
[52] U.S. Cl. .......................................... 177/1; 177/25; 177/165
[58] Field of Search .................... 177/1, 25, 50, 164, 177/165

[56] References Cited

U.S. PATENT DOCUMENTS 4,344,492 8/1982 Hirano .......................... 177/165 X
4,442,911 4/1984 Fukuda ............................ 177/25 X
4,465,149 8/1984 Kawashima et al. ........... 177/165 X Primary Examiner—George H. Miller, Jr.
Attorney, Agent, or Firm—Staas & Halsey

[57] ABSTRACT

A combinatorial weighing method for a computerized weighing apparatus employs those combination patterns, in which only one weighing machine from a pair of weighing machines is included to participate in those combinatorial computation, and a combination patterns, in which both machines of a single pair are part of the combination pattern. These combination patterns are used to compute a total combined weight value so that, when both weighing machines of one pair are selected as part of an optimum combination and discharge their articles, at least one of the machines in the pair is caused not to participate in a subsequent combinatorial computation but is subjected to a zero-point adjustment.

18 Claims, 28 Drawing Figures

FIG. 4(a).

| PAIRS | 1 | | 2 | | 3 | | 4 | | 5 | | 6 | |
|---|---|---|---|---|---|---|---|---|---|---|---|---|
| WEIGHING MACHINES | W1A | W1B | W2A | W2B | W3A | W3B | W4A | W4B | W5A | W5B | W6A | W6B |
| a | 0 | 0 | 0 | 0 ③ | 0 | 0 ⑨ | 0 | 0 ㉗ | 0 | 0 ㉛ | 0 | 0 ㉔㉓ |
| b | 0 | 1 | 0 | 1 ③ | 0 | 1 ⑨ | 0 | 1 ㉗ | 0 | 1 ㉛ | 0 | 1 ㉔㉓ |
| c | 1 | 0 | 0 | 0 ③ | 0 | 0 ⑨ | 0 | 0 ㉗ | 0 | 0 ㉛ | — | 0 ㉔㉓ |
| d | 1 | 1 | — | — | — | — | — | — | — | — | — | — |

FIG. 4(b).

| NUMBER OF COMBINATIONS / WEIGHING MACHINES PARTICIPATING IN COMBINATIONS | NO DOUBLING | ONE-PAIR DOUBLING | (NO DOUBLING) + (ONE-PAIR DOUBLING) | TOTAL COMBINATIONS |
|---|---|---|---|---|
| 12 | 728 | 1458 | 2186 | 4095 |
| 10 | 242 | 405 | 647 | 1023 |

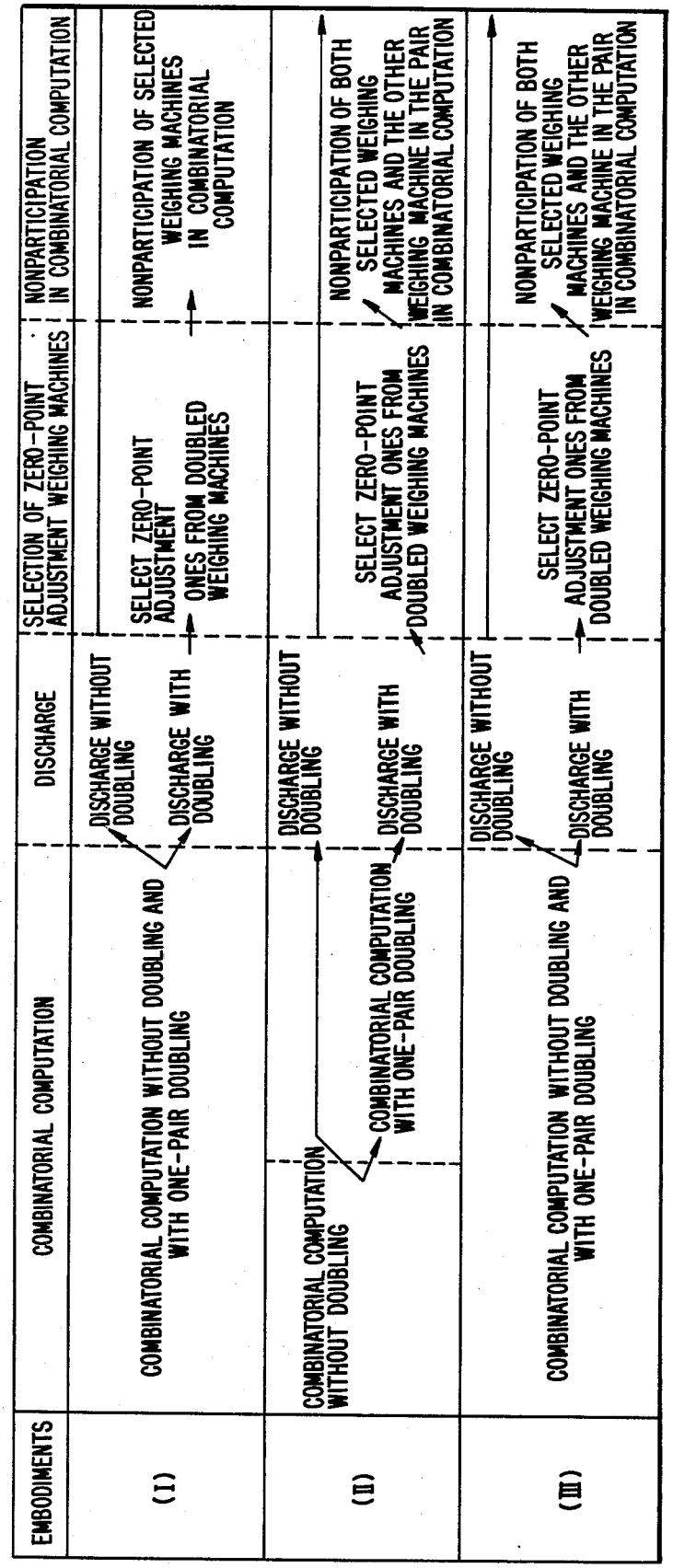

FIG. 10.

| ITEMS<br>EMBODIMENTS | COMBINATORIAL COMPUTATION | WEIGHING MACHINES NONPARTICIPATING IN COMBINATION | NUMBER OF MACHINES PARTICIPATING IN COMBINATION | ZERO-POINT ADJUSTMENT |
|---|---|---|---|---|
| (I) | NO DOUBLING AND ONE-PAIR DOUBLING | ONE ZERO-POINT ADJUSTMENT MACHINE | UNSPECIFIED | SUBSEQUENT TO DISCHARGE WITH DOUBLING |
| (II) | NO DOUBLING AND THEN WITH ONE-PAIR DOUBLING | ONE PAIR OF (i.e., TWO) ZERO-POINT ADJUSTMENT MACHINES | SPECIFIED (10 OR 12 MACHINES) | SUBSEQUENT TO DISCHARGE WITH DOUBLING |
| (III) | NO DOUBLING AND THEN WITH ONE-PAIR DOUBLING | ONE-PAIR OF (i.e., TWO) ZERO-POINT ADJUSTMENT MACHINES | SPECIFIED (10 OR 12 MACHINES) | SUBSEQUENT TO DISCHARGE WITH DOUBLING |

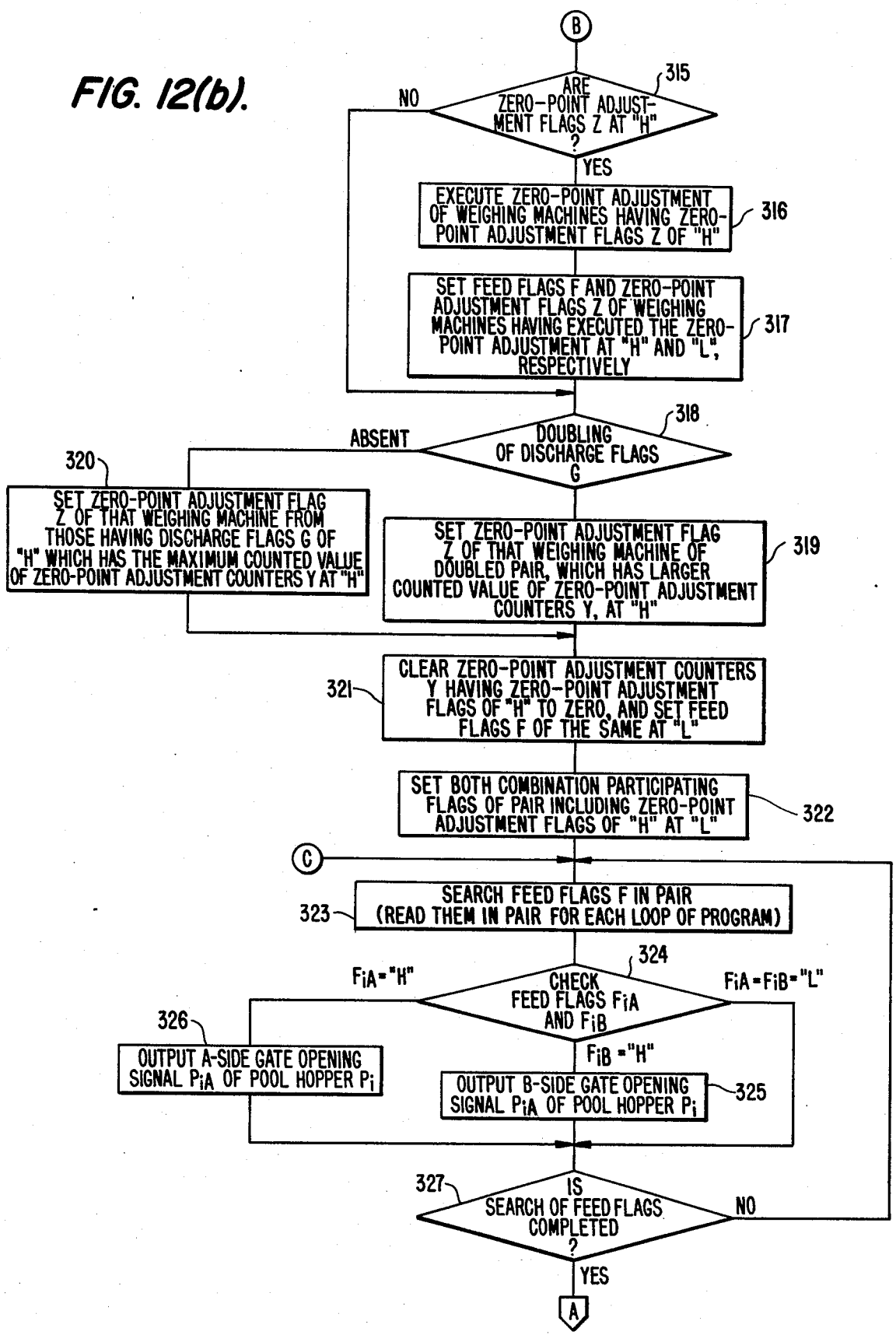

FIG. 13.

| EMBODIMENT | COMBINATORIAL COMPUTATION | DISCHARGE | SELECTION OF ZERO-POINT ADJUSTMENT WEIGHING MACHINES | NONPARTICIPATION IN COMBINATORIAL COMPUTATION |
|---|---|---|---|---|
| (IV) | COMBINATORIAL COMPUTATION WITHOUT DOUBLING AND WITH ONE-PAIR DOUBLING | DISCHARGE WITHOUT DOUBLING → | SELECT ZERO-POINT ADJUSTMENT ONES FROM DISCHARGED WEIGHING MACHINES | NONPARTICIPATION OF BOTH SELECTED WEIGHING MACHINES AND THE OTHER WEIGHING MACHINE IN THE PAIR IN COMBINATORIAL COMPUTATION |
| | | DISCHARGE WITH DOUBLING → | SELECT ZERO-POINT ADJUSTMENT ONES FROM DOUBLED WEIGHING MACHINES | |

FIG. 14.

| ITEMS / EMBODIMENT | COMBINATORIAL COMPUTATION | WEIGHING MACHINES NONPARTICIPATING INTO COMBINATION | NUMBER OF MACHINES PARTICIPATING IN COMBINATION | ZERO-POINT ADJUSTMENT |
|---|---|---|---|---|
| (IV) | NO DOUBLING AND ONE-PAIR DOUBLING | ONE PAIR OF (i.e. TWO) ZERO-POINT ADJUSTMENT MACHINES | SPECIFIED (10) | EACH TRIAL |

COMBINATORIAL WEIGHING METHOD WITH PAIRS OF SCALES AND ZERO ADJUSTMENT

BACKGROUND OF THE INVENTION

1. Field of the Invention

The present invention relates to a combinatorial weighing method for use with a computerized weighing apparatus of combinatorial weighing type, in which the weighed data of a plurality of weighing machines are combined to select the weighing machines which afford the optimum combination.

2. Description of the Prior Art

The combinatorial weighing type computerized weighing apparatus is designed to provide articles having a total combined weight value equal to a target weight value or closest to the target weight value by supplying the articles to respective weighing hoppers of a plurality of weighing machines, weighing the articles which have been dispensed to the weighing machines, computing combinations of the weight values obtained on the basis of the respective weight data of the weighing machines, selecting the combination of weighing machines (which will be referred to as the "optimum combination") that gives the total combined weight value equal or closest to the target weight value within preset allowable limits, and opening only the weighing hoppers of the weighing machines providing the optimum combination.

In such a computerized weighing apparatus, the weighing hoppers which have discharged the articles belonging to the optimum combination, are supplied with articles for the next weighing cycle from pool hoppers which are arranged thereabove, and then a dispersing feeder supplies articles to the emptied pool hoppers.

FIG. 1 is a block diagram of the computerized weighing apparatus described above. In this weighing apparatus, when a timing signal T is delivered from a packaging machine (not shown) to a computation control unit 5 constructed of a microcomputer and so forth, this computation control unit 5 feeds a start signal ST to a multiplexer 3 so that this multiplexer 3 introduces the weight value data $X_{1A}$ to $X_{nB}$ (at analog values) of a plurality of weighing machines 2 into an A/D converter 4. In accordance with the weight value data which have been converted into digital values and fed to the computation control unit 5, this unit 5 computes combinations of the weight value data on the basis of preformed combination patterns. The computation control unit 5 compares the computed combinatorial weight values with the target weight value, which has been set by a target weight setting unit 7, to select the optimum combination of weighing machines until it feeds operation signals to a drive unit 1 for driving the hoppers of the weighing machines providing the optimum combination. At this time, the weight values to be selected for the optimum combination are smaller than the upper limit which is preset by an upper limit setting unit 6.

The relationship between the weighing hoppers belonging to the weighing machines and the pool hopper for supplying weighing hoppers with articles will be described with reference to FIGS. 2(a), (b) and (c). In the construction shown in FIG. 2(a), an A-side weighing hopper and a B-side weighing hopper are arranged below the A and B-side gates, respectively, of a two-gate pool hopper, so that the A-side hopper is supplied with the articles when the A-side gate of the pool hopper is opened. In the construction shown in FIG. 2(b), a dispersing chute is arranged below the pool hopper so that it can be pivoted to the right or left to disperse and supply the articles to the A and B-side weighing hoppers. In the construction shown in FIG. 2(c), on the other hand, a moving pool hopper is made movable to the right and left to supply articles to the A and B-side weighing hoppers.

Reverting to FIG. 1, the signals to be delivered from the computation control unit 5 to the hopper drive unit 1 are classified, in the construction of FIG. 2(a), into signals $P_{1A}$ to $P_{nA}$ for opening the A-side gates of the pool hoppers, signals $P_{1B}$ to $P_{nB}$ for opening the B-side gates of the same, and a signal q for opening the weighing hoppers. On the other hand, the weighing machines 2 are paired and arranged such that six pairs (i.e., twelve machines) $W_{1A}$, $W_{1B}$ to $W_{nA}$, $W_{nB}$, for example, are equidistantly arranged in a circular or straight shape.

The weighing machine having any of the aforementioned constructions has its zero point shifted naturally by the ambient temperature or due to aging. This shift makes a zero-point adjustment necessary for correcting itself.

In the prior art, the shift of the zero point cannot be quantitatively judged as to the conditions under which the weighing machine is used and how long the machine is used. This makes it impossible to execute the zero-point adjustment rationally.

On the other hand, in the computerized weighing apparatus having two weighing hoppers arranged for each pool hopper, as shown in FIGS. 2(a), (b) or (c), the two weighing hoppers, i.e., the weighing machines 2 for affording the weight value data are arranged for each pool hopper. This enables the computerized weighing apparatus to have an advantage that the weight value data are obtained two times. However, the computerized weighing apparatus has a problem that, when two weighing machines belonging to one pair are both selected as part of the optimum combination to discharge the articles (which will be referred to as a "doubling discharge"), the succeeding articles cannot be supplied to the two corresponding weighing hoppers before the subsequent two weighing cycles. Because of this problem, the number of weighing machines to participate in the next combinatorial weighing cycle is reduced, if the number of the doubling discharge pairs of increased, so that the number of combinations is accordingly reduced, thereby to deteriorating the combinatorial weighing accuracy. If the doubling discharge is wholly prohibited in order to obviate that deterioration, the number of combinations in one weighing operation required for the computerized weighing apparatus causes a problem in that the number of weighing machines has to be increased. If one weighing machine belonging to one pair is replenished with articles after the a doubling discharge and is continuously selected for the optimum combination, such that it is selected again for the optimum combination to discharge its articles and is continuously caused to discharge its articles in the subsequent weighing cycle also, the computerized weighing apparatus also has a problem in that the restoring operation of replenishing the emptied weighing hopper with the articles is elongated. As a result, the combinatorial weighing accuracy is further deteriorated.

SUMMARY OF THE INVENTION

It is, therefore, an object of the present invention to provide a combinatorial weighing method for use with a computerized weighing apparatus having a plurality of pairs of weighing machines, each pair being arranged for a corresponding pool hopper, wherein the method is intended to prevent the number of combinations to be computed in a subsequent cycle from being reduced, thereby improving the combinatorial weighing accuracy by allowing both of the weighing machines of only one pair to be selected for the optimum combination.

Another object of the present invention is to provide a combinatorial weighing method of the above type, which hastens the restoration of the weighing machines after the doubling discharge and which is intended to disable one weighing machine involved in the doubling discharge, so that it cannot be supplied with articles while its zero point is adjusted reliably, thereby allowing that weighing machine to be used effectively without being periodically interrupted for the zero-point adjustment.

Still another object of the present invention is to provide the combinatorial weighing method of the above type, which hastens the restoration of the weighing machines after the doubling discharge and which is intended to disable one weighing machine of such one pair in each cycle, so that it cannot be supplied with articles when the doubling discharge occurs, while its zero point is adjusted reliably, thereby allowing the weighing machines to be used effectively without being periodically interrupted for the zero-point adjustment.

A further object of the present invention is to provide the combinatorial weighing method of the above type, which hastens the restoration of the weighing machines after the doubling discharge, by detecting the previous discharge state of the articles to prohibit the doubling discharge from occurring continuously, and which is intended to disable one weighing machine after the doubling discharge so that it cannot be supplied with articles while its zero point is adjusted reliably, thereby allowing the weighing machines to be used effectively without being periodically interrupted for the zero-point adjustment.

According a first inventive concept of the present invention, there is provided a combinatorial weighing method for a computerized weighing apparatus comprising: a plurality of pairs of weighing machines for weighing articles supplied thereto and for providing weight value data; and a computation control unit for computing combinations of weight values on the basis of the respective weight value data of said weighing machines, to select the optimum combination of said weighing machines, which gives a total combined weight value equal to or closest to a target weight value, and to control the discharge of said articles from the weighing machines corresponding to said optimum combination, said combinatorial weighing method comprising:

(a) a first step of selecting combination patterns, which include only one of the two weighing machines in a pair, and combination patterns which include both weighing machines in a pair for only one of said pairs;

(b) a second step of computing the total combined weight values on the basis of the combination patterns, selected in said first step, to determine said optimum combination; and (c) a third step of executing a subsequent combinatorial computation with said weighing machines, wherein when both weighing machines in a pair are selected together in said optimum combination at said second step one of the weighing machines from the selected pair, is excepted from the subsequent combinatorial computation, and a zero-point adjustment is executed for said one excepted weighing machine.

According to a second inventive concept of the present invention, there is provided a combinatorial weighing method for a computerized weighing apparatus comprising: a plurality of pairs of weighing machines for weighing articles supplied thereto and for providing weight value data, and a computation control unit for computing combinations of weight values on the basis of the respective weight value data of said weighing machines, to select the optimum combination of said weighing machines, which gives a total combined weight value equal to or closest to a target weight value, and to control the discharge of said articles from the weighing machines corresponding to said optimum combination, said combinatorial weighing method comprising:

(a) a first step of selecting combination patterns, which include only one of the two weighing machines in a pair, and combination patterns which include both weighing machines in a pair for only one of said pairs;

(b) a second step of computing the total combined weight values on the basis of the combination patterns, selected in said first step, to determine said optimum combination; and (c) a third step of executing a zero-point adjustment for one of the weighing machines selected as part of said optimum combination at said second step, during a subsequent combinatorial computation, and executing the subsequent combinatorial computation while eliminating from the combination patterns said one selected weighing machine and the weighing machine with which it is paired.

According to a third inventive concept of the present invention, there is provided a combinatorial weighing method for a computerized weighing apparatus comprising: a plurality of pairs of weighing machines for weighing articles supplied thereto and for providing weight value data; and a computation control unit for computing combination of weight values on the basis of the respective weight value data of said weighing machines, to select the optimum combination of said weighing machines, which gives a total combined weight value equal to or closest to a target weight value, and to control the discharge of said articles from the weighing machines corresponding to said optimum combination, said combinatorial weighing method comprising:

(a) a first step of executing a combinatorial computation based on combination patterns corresponding to combinations of the weighing machines excepting combination patterns which include both weighing machines of a pair, when two weighing machines of a pair have been selected in said optimum combination in the previous combinatorial computation so that they have discharged their articles;

(b) a second step of selecting an optimum combination including only one weighing machine from a pair as a result of said combinatorial computation of said first step;

(c) a third step of executing a combinatorial computation based on a combination patterns including only one weighing machine from a pair, and combination patterns including only one pair with both weighing machines, when only one weighing machine of a pair has been selected in said optimum combination in the previous combinatorial computation so that it has discharged its articles; and (d) a fourth step of selecting one of the two weighing machines in a pair, when the optimum combination, selected as a result of the combinatorial computation of said third step, includes both weighing machines of a single pair executing a zero-point adjustment for said one selected weighing machine in a subsequent combinatorial computation, and executing a combinatorial computation of said weighing machines excepting at least said one weighing machine having its zero point adjusted.

BRIEF DESCRIPTION OF THE DRAWINGS

Other objects, features and advantages of the present invention will become apparent from the following description taken in conjunction with the accompanying drawings, in which:

FIGS. 3 to 10 are used to explain first to third embodiments in accordance with a first inventive concept of the present invention wherein:

FIGS. 3(a) to (f) and FIGS. 7(a) to (d) are diagrams for describing the operation of the embodiments;

FIGS. 4(a) and (b) are charts for explaining the combination patterns of the first embodiment;

FIGS. 5(a) to (f) are diagrams showing the construction of the memories used to perform the method of the invention;

FIGS. 6 and 8 are flow charts of the operations of the first and second embodiments; and FIGS. 9 and 10 are charts for explaining the characteristics of the first to third embodiments.

FIGS. 11 to 14 are used to explain a fourth embodiment in accordance with a second inventive concept of the present invention, wherein:

FIGS. 11(a) to (c) are diagrams for describing the operations of the fourth embodiment;

FIG. 12 is a flow chart of the operation of the fourth embodiment; and

FIGS. 13 and 14 are charts for explaining the characteristics of the fourth embodiment.

FIGS. 15 to 20 are used to explain fifth and sixth embodiments in accordance with a third inventive concept of the present invention, wherein:

FIGS. 15(a) to (i) and FIGS. 18(a) to (f) are diagrams for describing the operations of the fifth and sixth embodiments;

FIGS. 16(a) to (g) are diagrams showing the construction of the memories used to perform the method of the invention;

FIG. 17 is a flow chart of the operations of the fifth embodiment; and

FIGS. 19 and 20 are charts for explaining the characteristics of the fifth and sixth embodiments.

DESCRIPTION OF THE PREFERRED EMBODIMENTS

The present invention will be described specifically in the following in connection with the embodiments thereof with reference to the accompanying drawings.

FIGS. 3 to 10 are used to explain first to third embodiments according to the first inventive concept of the present invention.

[I] FIRST EMBODIMENT

Figure 3:
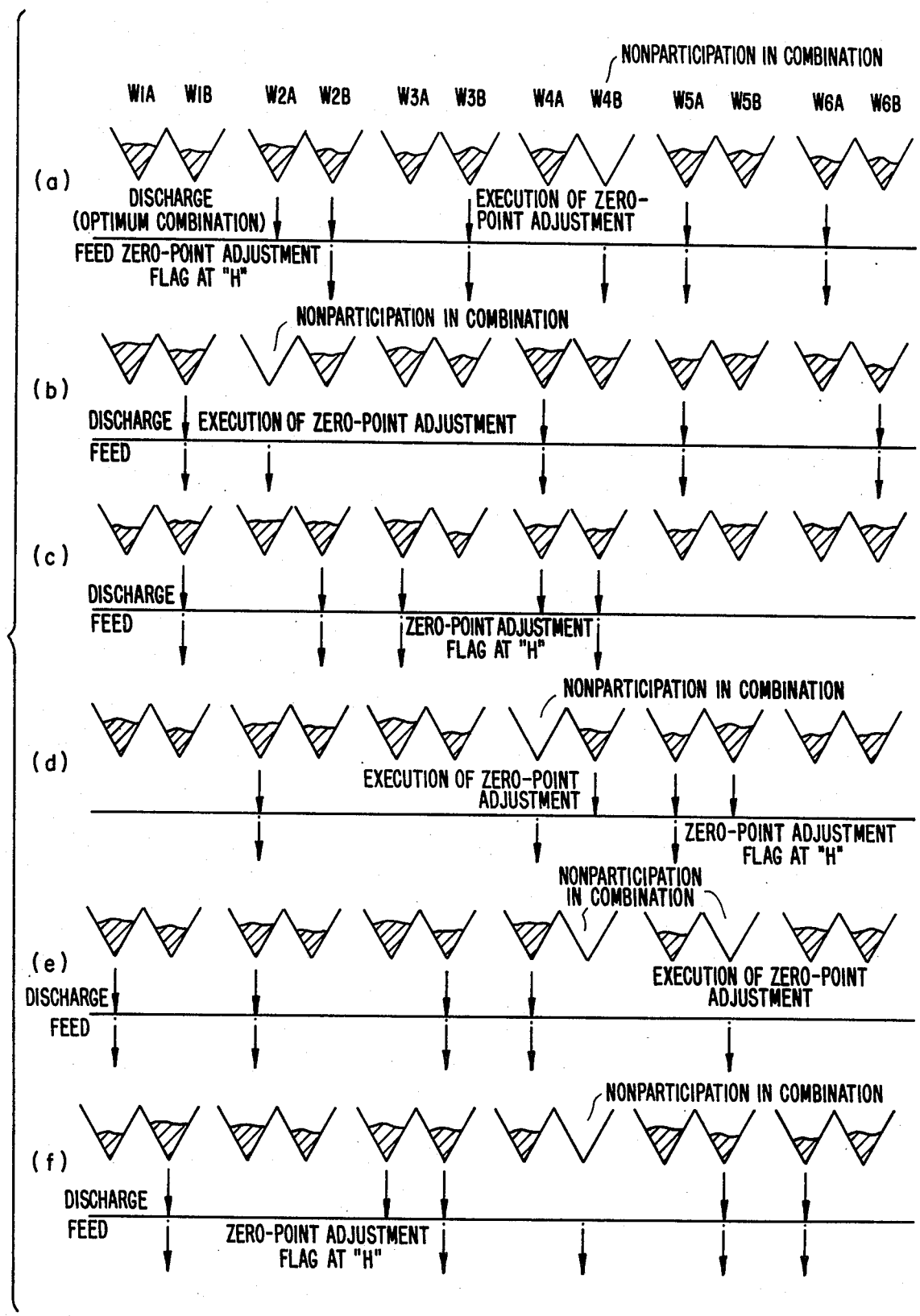

FIG. 3 is a diagram for explaining the operation of the first embodiment of a method for practicing adjustments of weighing machines when the optimum combination is selected only from either a combination pattern having no doubling, wherein only one weighing machine from a pair is selected, or a combination pattern with one-pair doubling, wherein only a single pair of weighing machines is selected as part of the optimum combination.

The following description is directed to an example in which the twelve weighing machines $W_{1A}$ to $W_{6B}$ are grouped into six pairs. FIG. 3(a) shows an example in which eleven weighing machines (i.e., all weighing machines except machine $W_{4B}$) are made to participate in the combination computations, while the nonparticipating machine $W_{4B}$ is subjected to zero-point adjustment. Since, in this example, both weighing machines ($W_{2A}$ and $W_{2B}$) belonging to a pair are selected as part of the optimum combination, the computation control unit 5 sets the weighing machine $W_{2A}$ with the zero-point adjustment flag at "H", when it selects the optimum combination, so that the weighing machine $W_{2A}$ may be left nonparticipating in the computations while subjected to the zero-point adjustment in the next combinatorial weighing operation. The computation control unit 5 selects the five weighing machines $W_{2A}$, $W_{2B}$, $W_{3B}$, $W_{5A}$ and $W_{6A}$ for the optimum combination and causes them to discharge their respective articles. In other words, this is an example of one-pair doubling because two weighing machines $W_{2A}$ and $W_{2B}$ belonging to a common pair are selected in the optimum combination to discharge their articles. Of the weighing machines from which the articles have been discharged, moreover, the four weighing machines other than the machine $W_{2B}$ (to be subjected to the zero-point adjustment in the subsequent cycle) and the weighing machine $W_{4B}$, (which has been subjected to the zero-point adjustment in the present cycle), are replenished with articles.

FIG. 3(b) shows the operations of the weighing machines, which are to be executed subsequently to the operations of FIG. 3(a). In the example of FIG. 3(b), the weighing machine $W_{2A}$, which has been set in the preceding cycle with the zero-point adjustment flag at "H", does not participate in the computations in the present cycle but is subjected to zero-point adjustment. This example is one without doubling, because the four weighing machines $W_{1B}$, $W_{4A}$, $W_{5A}$ and $W_{6B}$ which are selected for the optimum combination do not include two weighing machines from a pair. The weighing machines $W_{1B}$, $W_{4A}$, $W_{5A}$ and $W_{6B}$ which have discharged their articles and the weighing machine $W_{2A}$ which has been subjected to zero-point adjustment, are replenished with articles.

In the example of FIG. 3(c), all the weighing machines are made to participate in the computations, and the machines from one pair (i.e. weighing machines $W_{4A}$ and $W_{4B}$) are both selected as part of the optimum combination, and machine $W_{4A}$ is set with the zero-point adjustment flag at "H", so that it may have its zero point adjusted in the subsequent cycle.

FIG. 3(d) shows an example of operations subsequent to those of FIG. 3(c). In the example of FIG. 3(d), the weighing machine $W_{4A}$ with the zero-point adjustment flag at "H" is not made to participate into the computations but is subjected to the zero-point adjustment. This is an example of one-pair doubling because the paired weighing machines $W_{5A}$ and $W_{5B}$ are selected in the optimum combination, and there is also selected the weighing machine $W_{4B}$ which is paired with the machine $W_{4A}$ (which is being subjected to the zero-point adjustment). In this example, the computation control unit 5 sets the weighing machine $W_{5B}$ of the one-pair doubling with the flag "H" so that the latter may have its zero point adjusted in the next cycle.

FIG. 3(e) shows an example of operations subsequent to those of FIG. 3(d). In this example, not only the weighing machine $W_{5B}$ (which is to be subjected to the zero-point adjustment) but also the weighing machine $W_{4B}$ cannot receive the subsequent supply. This is because it has been selected in the optimum combination so that it has discharged its articles, but the supply of articles is delayed so that it is left nonparticipating in the subsequent computations. This limits the participants to the remaining ten weighing machines. This example has no doubling because the weighing machines selected for the optimum combination do not belong to the respectively common pairs. Moreover, the weighing machine $W_{4A}$ paired with the machine $W_{4B}$ is selected in the optimum combination in this cycle, too.

FIG. 3(f) shows an example, in which the weighing machine $W_{4B}$ has its restoration further delayed, because the partner machine $W_{4A}$ has been selected even though the machine $W_{4B}$ itself has not been made to participate in the previous combination computations, so that the combinatorial computation is conducted with the remaining eleven machines and the partner weighing machine $W_{3A}$ contained in the optimum combination is set with the zero-point adjustment flag "H".

Whenever one weighing machine of any pair is continuously incorporated into the optimum combination, the partner machine has its restoration delayed for a corresponding time. The examples of the operations of FIG. 3 are summarized and enumerated in Table 1 (where "O" indicates YES and "X" indicates NO).

TABLE 1

| No. | Doubling | Flag "H" | Adjustment | Nonparticipants | Participants |
|---|---|---|---|---|---|
| a | O | O | O | 1 | 11 |
| b | X | X | O | 1 | 11 |
| c | O | O | X | 0 | 12 |
| d | O | O | O | 1 | 11 |
| e | X | X | O | 2 | 10 |
| f | O | O | X | 1 | 11 |

In the first embodiment, as is apparent from Table 1, one of the paired weighing machines is set with the flag "H", only in the case of the one-pair doubling, so that it may be subjected to the zero-point adjustment in the subsequent weighing operation. Incidentally, if, during the execution of the zero-point adjustment of one weighing machine, the partner machine is selected in the optimum combination, as has been described above, that one weighing machine cannot be replenished with articles. This results in the two paired weighing machines being empty at the end of the zero-point adjustment. As a result, the number of the weighing machines to participate in the combination computations is indefinite, e.g., 11, 11, 10 and so on, partly because only one of the partners can be supplied and partly because one of the partners may possibly be continuously selected.

The determination of the combination patterns of the weight value data will be described in the following. When n-number of weighing machines are arranged, generally speaking, the total number of combinations is expressed by $(2^n - 1)$. From these numerous combinations, according to the present invention, the number of combinations including weighing machine pairs where both machines are selected in the optimum combination is limited to one, so that a combination pattern without doubling and a combination pattern with doubling are selected. The method of forming those combination patterns is exemplified, as follows:

(1) Count Method:

A counter is consecutively incremented, and whether the combination pattern has the one-pair doubling or not, the doubling is checked upon each increment.

(2) ROM Memory Method:

All the patterns without doubling and with one-pair doubling are stored in advance in a ROM and are called consecutively so that they may be formed.

(3) Combination Method by Pairs:

The patterns without doubling and with one-pair doubling are combined by pairs in a branching manner to form the combination patterns, as illustrated by Table 2.

TABLE 2

| Weighing Machines | $W_{1A}$ | $W_{1B}$ | $W_{2A}$ | $W_{2B}$ | $W_{3A}$ | $W_{3B}$ |
|---|---|---|---|---|---|---|
| Combination Patterns | 0 | 0 | 0 | 0 | 0 | 0 |
|  | 0 | 1 | 0 | 1 | 0 | 1 |
|  | 1 | 0 | 1 | 0 | 1 | 0 |
|  | 1 | 1 | 1 | 1 | 1 | 1 |

Of the above-enumerated methods (1) to (3), the methods (2) and (3) are useful and highly efficient because they can form the necessary combination patterns without the doubling and with the one-pair doubling. FIG. 4(a) is a diagram for explaining the number of combinations thus obtained. For example, the number of the combinations is indicated by circled number 3 in case pattern of row a of weighing machines of the second pair is combined with the non-doubling patterns a, b and c of the weighing machines of the first group. The row a of the third pair has the number of combinations of $3^2 = 9$ with the non-doubling patterns a, b and c of the weighing machines of the first and second pairs. Likewise, the number of combinations of the sixth pair reaches $3^5 = 243$. FIG. 4(b) enumerates the numbers of combinations comparison. The number of total combinations is $(2^{12} - 1) = 4,095$ for twelve weighing machines and $(2^{10} - 1) = 1,023$ for ten weighing machines. In contrast, the number of combinations when only the combination patterns without doubling and with one-pair doubling are selected is reduced to 2,186 for twelve weighing machines and to 647 for ten weighing machines.

Figure 1:
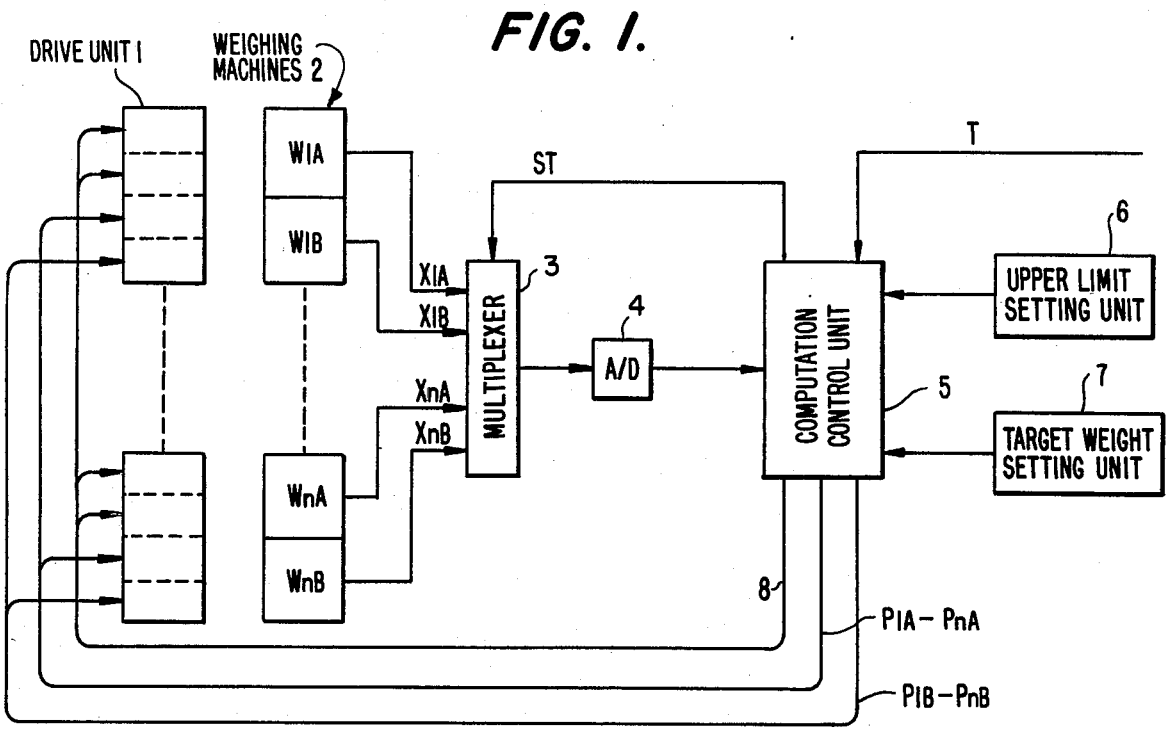
FIG. 1 is a block diagram of a computerized weighing apparatus.
Figure 2:
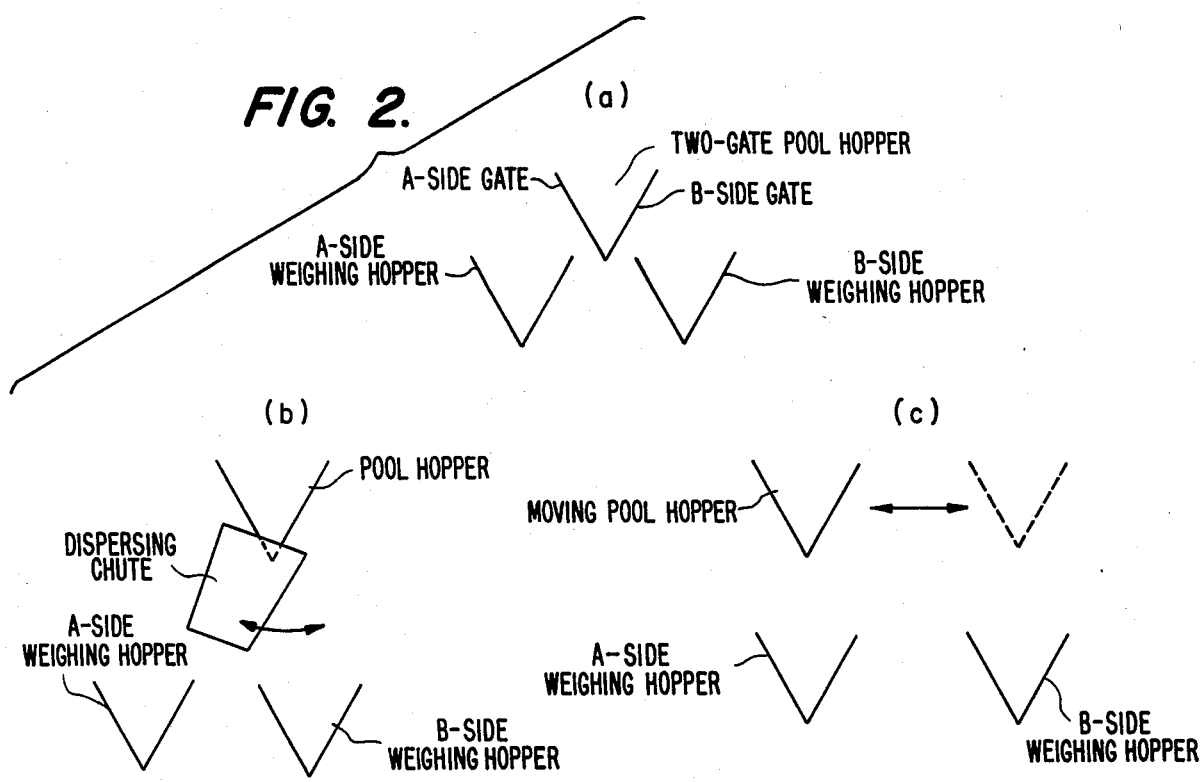
FIGS. 2(a), (b) and (c) are diagrams showing the constructional relationships between the pool hoppers and the weighing hoppers.
Figure 5:
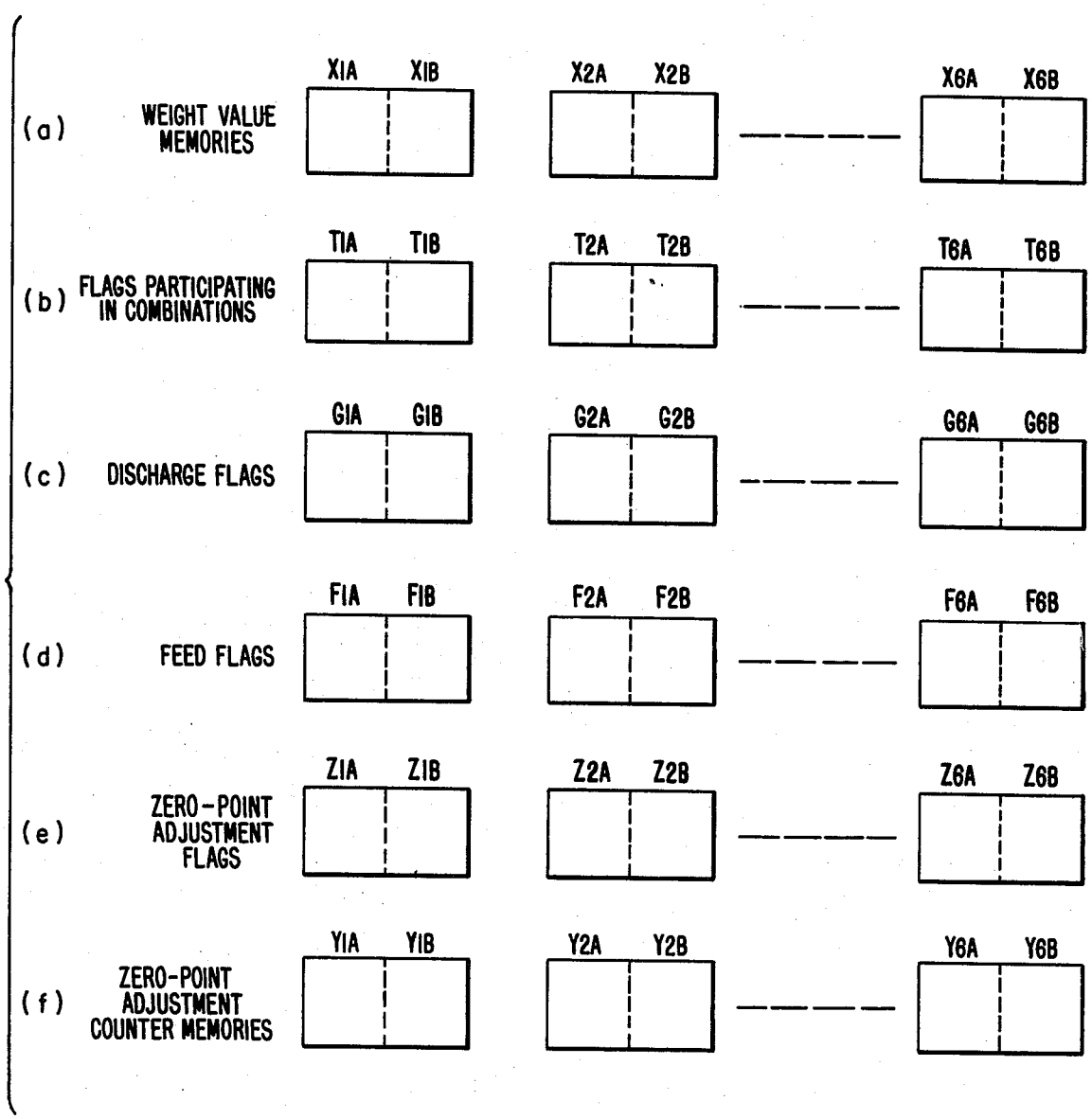

Examples of the memories used in the present invention will be described in the following with reference to FIG. 5. FIG. 5(a) shows weight value memories which are stored with the respective weight value data $X_{1A}$ to $X_{6B}$ of the weighing machines $W_{1A}$ to $W_{6B}$. FIG. 5(b) shows flags $T_{1A}$ to $T_{6B}$ participating in the combinations, which are set to "H" or "L" in a manner to correspond to the respective weighing machines, so that the weighing machines with the flags "H" may participate in the combinatorial computations. FIG. 5(c) shows discharge flags $G_{1A}$ to $G_{6B}$, which are set at "H" or "L" in a manner to correspond to the respective weighing machines, so that the weighing machines with the flags "H" may have their respective weighing hoppers opened to discharge their respective articles. FIG. 5(d) shows feed flags $F_{1A}$ to $F_{6B}$ which are set at "H" or "L" in a manner to correspond to the respective weighing machines, so that the weighing machines with the flags "H" may have their pool hoppers opened to feed or supply their respective weighing hoppers with the articles. For this supply, the A or B-side gates are opened for the case where the two gates open pool hoppers shown in FIG. 2(a) are used, whereas the pivoting or moving operations are switched when the dispersing chutes or the moving pool hoppers shown in FIGS. 2(b) and (c) are used. FIG. 5(e) shows zero-point adjustment flags $Z_{1A}$ to $Z_{6B}$ which are set at "H" or "L" in a manner to correspond to the respective weighing machines, so that the weighing machines with the flags "H" may have their respective zero-points adjusted. FIG. 5(f) shows zero-point adjustment counter Memories $Y_{1A}$ to $Y_{6B}$ in which are stored the numbers of the respective discharging or weighing operations of the weighing machines.

Figure 6A:
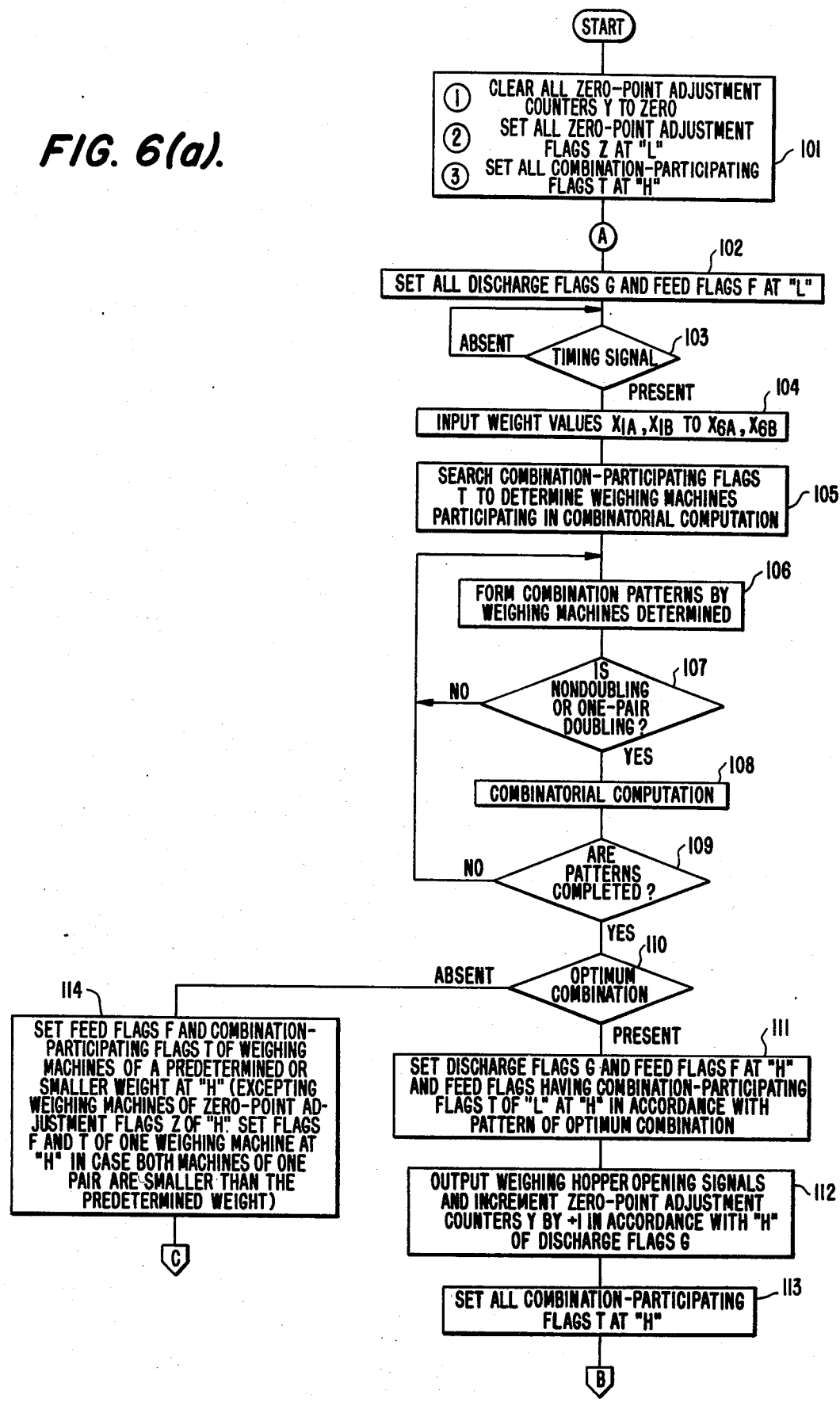
Figure 6B:
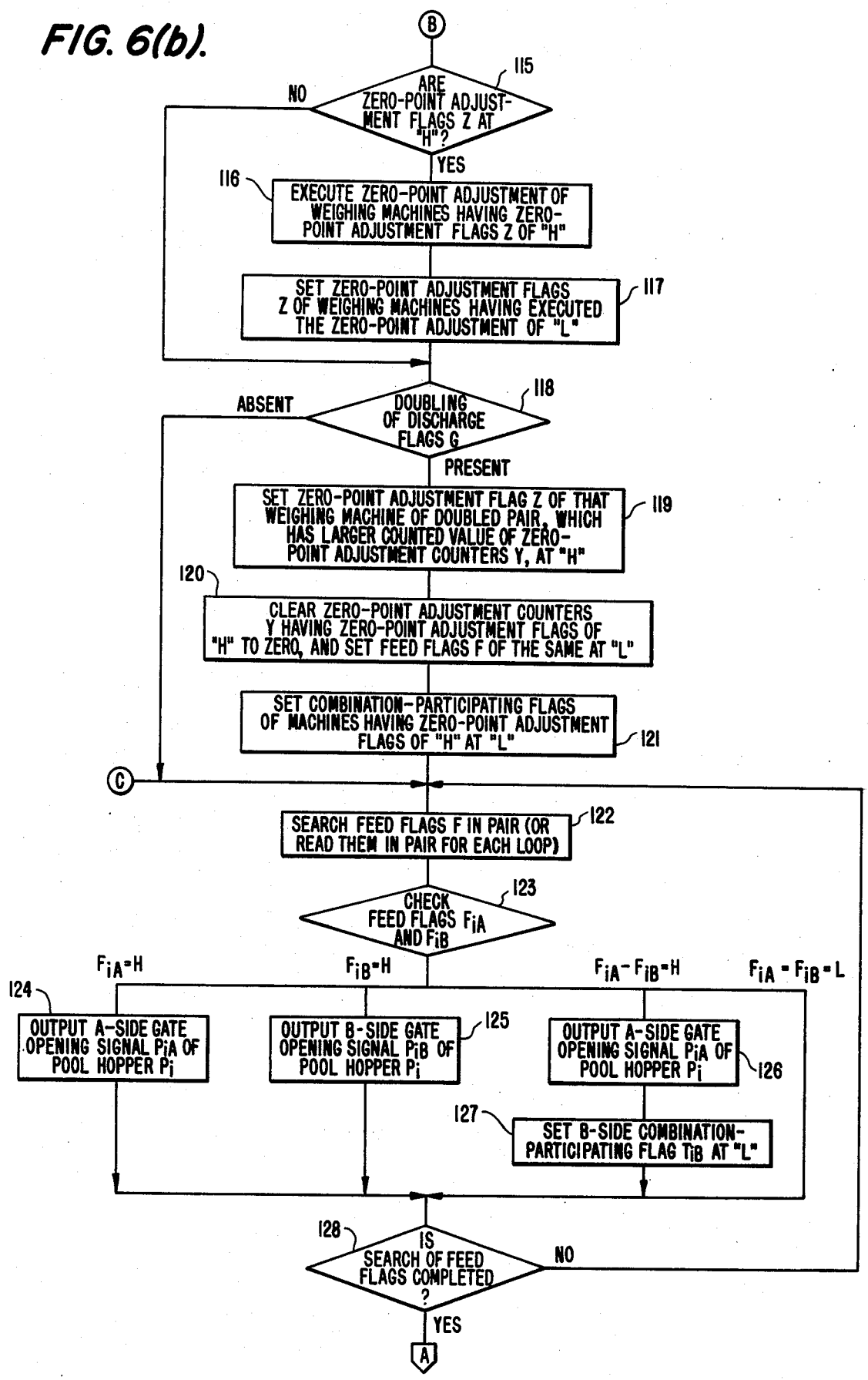

FIG. 6 is a flow chart for explaining the operation of the first embodiment. This embodiment will be described in the following with reference to the flow chart of FIG. 6.

(1) Step 101:
The computation control unit 5:
① Clears all the zero-point adjustment counters Y to zero;
② Sets all the zero-point adjustment flags Z at "L"; and
③ Sets all the combination-participating flags T at "H".

Now, the computerized weighing apparatus is set with the initial conditions for starting the combinatorial weighing operations.

(2) Step 102:
The computation control unit 5 sets all the discharge flags FG and the feed flags at "L".

(3) Step 103:
The computation control unit 5 checks whether the timing signal from the packaging machine is inputted or not, and advances to a subsequent step if present.

(4) Step 104:
In response to the timing signal T, the computation control unit 5 feeds the start signal ST to input the respective weight value data $X_{1A}$ to $X_{6B}$ of the weighing machines $W_{1A}$ to $W_{6B}$ to the multiplexer 3 and through the A/D converter 4.

(5) Step 105:
The computation control unit 5 searches the combination-participating flags T to cause the weighing machines with the flags "H" to participate in the combinatorial computation. In the initial state, all twelve weighing machines participate in the computations. Incidentally, in the case of this embodiment, the number of weighing machines to participate in the computations is indefinite, as illustrated in Table 1.

(6) Step 106:
The computation control unit 5 forms all the combination patterns that are composed of the weighing machines determined at the step 105.

(7) Step 7:
The computation control unit 5 checks, for each combination, whether the combination includes non-doubling or one-pair doubling and advances to a subsequent step if YES.

(8) Step 108:
The computation control unit 5 executes the combinatorial computations for each non-doubling or one-pair doubling combination pattern determined at the step 107 based on the weight value data of the weighing machines.

(9) Step 109:
The computation control unit 5 checks whether all the patterns have been subjected to the processings of steps 106 to 108, and advances to a subsequent step if YES.

(10) Step 110:
The computation control unit 5 compares the combinatorial weight values determined by the combinatorial computations with a targe weight value to check whether or not a combination of weighing machines forming an optimum combination are present, and advances to a step 111 if present or to a step 114 is absent.

(11) Step 114:
In the absence of the optimum combination, the computation control unit 5 sets both the feed flags F and the combination-participating flags T at "H" so as to replenish the weighing machines having weight value data smaller than a predetermined value with articles, to supply them with starting articles or to refresh them. In this case, however, the control unit 5 excludes the weighing machines with the zero-point adjustment flags Z at "H" and sets the flags F and T of one weighing machine having a smaller weight value, for example, if both the machines of one pair have weight values less than the predetermined value.

(12) Step 111:
In the presence of the optimum combination, the computation control unit 5 sets the discharge flags G and the feed flags F of the corresponding weighing machines at "H" in accordance with the pattern of the optimum combination, and sets the feed flags F corresponding to the weighing machines having the combination-participating flags T of "L" at "H".

In this case, as shown in FIG. 3(e), the combination-participating flags T of two or more weighing machines may be at "L".

(13) Step 112:
The computation control unit 5 outputs the opening signals to the weighing hoppers of the weighing machines having the discharge flags G of "H" and increments the zero-point adjustment counters Y corresponding to the weighing machines having the discharge flags of "H" by +1. In other words, the computation control unit 5 counts the number of discharges for each weighing hopper.

(14) Step 113:
The computation control unit 5 sets all the combination-participating flags T at "H".

(15) Step 115:
The computation control unit 5 checks the respective weighing machines as to whether or not any of he zero-point adjustment flags Z are at "H", and advances to a step 116 if YES and to a step 118 if NO.

(16) Step 116:

The computation control unit 5 executes the zero-point adjustments of the weighing machines having the zero-point adjustment flags Z of "H" because those machines were selected for the optimum combination in the previous combinatorial weighing operation, so that they have discharged their articles.

(17) Step 117:

The computation control unit 5 sets the zero-point adjustment flags Z of the weighing machines which have the executed the zero-point adjustments, at "L". At this time, the feed flags F of those weighing machines have already been set at "H" at the step 111, so that they are prepared for the state in which they are to be supplied with articles in the subsequent combinatorial weighing operation.

(18) Step 118:

The computation control unit 5 checks the doubling of the discharge flags G ($G_{iA}$ and $G_{iB}$) and advances to a step 119 in the presence and to a step 122 in the absence.

(19) Step 119:

The computation control unit 5 sets H the zero-point adjustment flag Z of that weighing machine of the doubled pair, which has a larger counted value of the zero-point adjustment counter Y, and, which has conducted the discharge.

(20) Step 120:

The computation control unit 5 clears to zero the zero-point adjustment counters Y corresponding to the weighing machines having the zero-point adjustment flags of "H", and sets the feed flags F of those weighing machines at "L", so that the machines may be prohibited from being supplied and may be subjected to the zero-point adjustment in the subsequent combinatorial weighing operation.

(21) Step 121:

The computation control unit 5 sets the combination-participating flags of the weighing machines having the zero-point adjustment flags of "H" at "L", so that those weighing machines may not participate in the subsequent combinatorial computations.

(22) Step 122:

The computation control unit 5 reads and searches the feed flags F in pair for each loop of the program.

(23) Step 123:

The computation control unit 5 checks the feed flags $F_{iA}$ and $F_{iB}$.

(24) Step 124:

The computation control unit 5 outputs the A-side gate opening signal $P_{iA}$ of the pool hopper $P_i$ of the weighing machine having the feed flag $F_{iA}$ of "H".

(25) Step 125:

The computation control unit 5 outputs the B-side gate opening signal $P_{iB}$ of the pool hopper $P_i$ of the weighing machine having the feed flag $F_{iB}$ of "H".

(26) Step 126:

In case both the feed flags $F_{iA}$ and $F_{iB}$ are at "H", i.e., in case both the weighing machines of a common pair are empty and are not subjected to the zero-point adjustment, the computation control unit 5 outputs the A-side gate opening signal $P_{iA}$ of the pool hopper $P_i$ of the corresponding weighing machines.

(27) Step 127:

Subsequently to the step 126, the computation control unit 5 sets the B-side combination-participating flag $T_{iB}$ of the corresponding weighing machine at "L".

(28) Step 128:

The computation control unit 5 checks whether or not the search of the feed flags is completed, and executes again the processings from Ⓐ if YES and returns to the step 122 to repeat the subsequent processings if NO.

[II] SECOND EMBODIMENT

Figure 7:
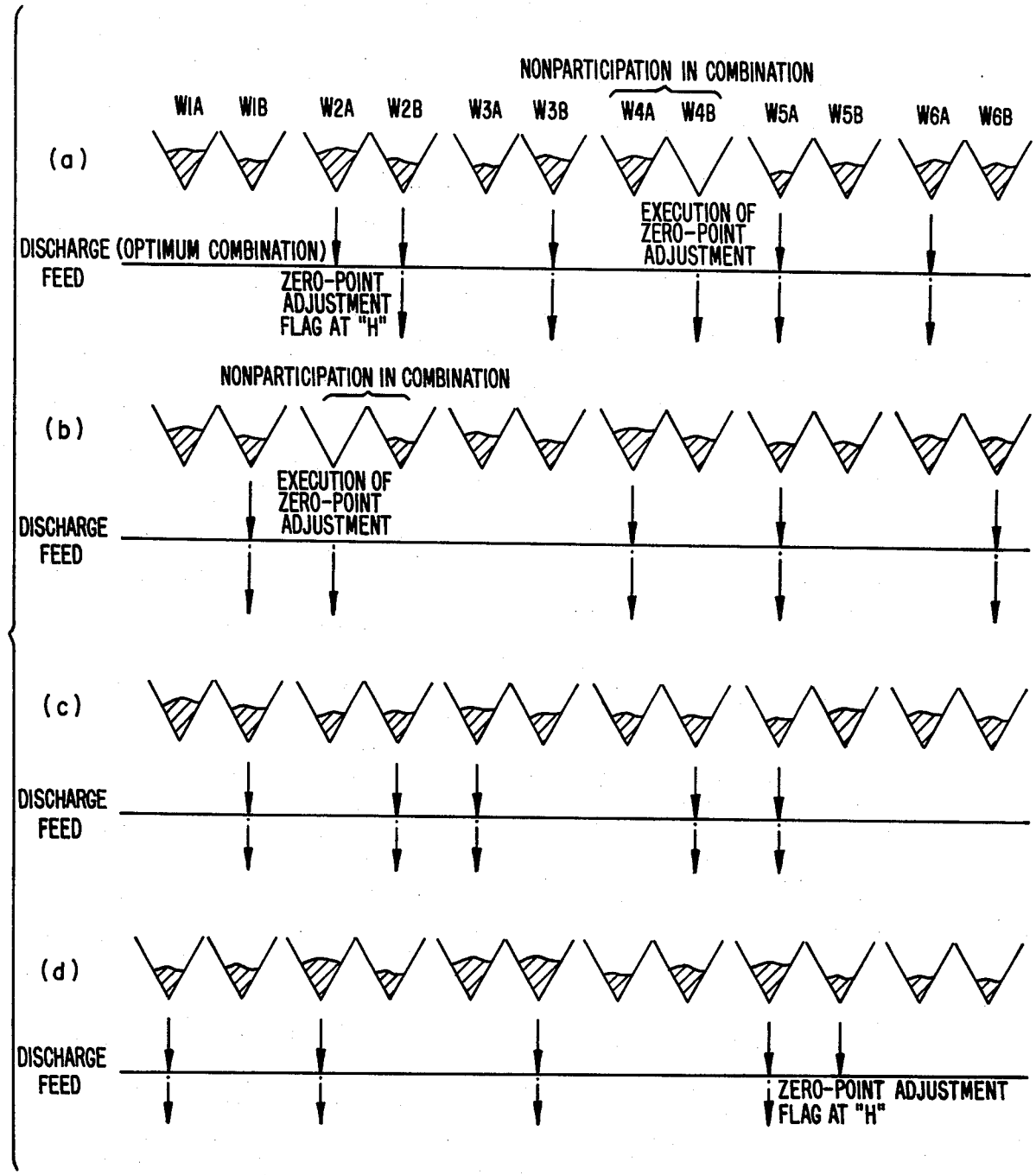

FIG. 7 is an explanatory diagram of the second embodiment of the invention. FIG. 7(a) shows an example with doubling, in which both the paired weighing machines $W_{2A}$ and $W_{2B}$ are selected in the optimum combination. The weighing machine $W_{2A}$ has its zero-point adjustment flag at "H". In this example, on the other hand, neither the weighing machine $W_{4B}$ (having been subjected to the zero-point adjustment) nor the other weighing machine $W_{4A}$ (paired with the former) is made to participate in the combinatorial weighing operation, so that the remaining ten weighing machines participate in the combinatorial computations. FIG. 7(b) shows an example without doubling, in which only one of the weighing machines of a pair can be selected in the optimum combination. The weighing machine $W_{2A}$ (having its zero-point adjustment flag set at "H" in the previous combinatorial computation) is subjected to a zero-point adjustment. In this example, neither the weighing machine $W_{2A}$ (having its zero point adjusted) nor the partner weighing machine $W_{2B}$ is made to participate in a combinatorial computation at this time, so that the remaining ten weighing machines are caused to participate in the combinatorial computation. FIG. 7(c) shows an example without doubling, in which none of the weighing machines selected for the optimum combination belong to common pairs. In this example, no zero-point adjustment is executed. As a result, all twelve weighing machines participate in the combinatorial computations. FIG. 7(d) shows an example with doubling, in which the paired weighing machines $W_{5A}$ and $W_{5B}$ are selected in the optimum combination, so that the latter one $W_{5B}$ is set with the zero-point flag at "H".

The operational examples of FIG. 7 are enumerated in Table 3:

TABLE 3

| No. | Doubling | Flag "H" | Adjustment | Nonparticipants | Participants |
| --- | --- | --- | --- | --- | --- |
| a | O | O | O | 2 | 10 |
| b | X | X | O | 2 | 10 |
| c | X | X | X | 0 | 12 |
| d | O | O | X | 0 | 12 |

In the second embodiment, as will be described with reference to the flow chart of FIG. 8, the combinatorial computation is conducted first with the pattern having no doubling, so that the weighing machines for the optimum combination are selected and emptied of their articles. In case the optimum combination cannot be selected with the pattern having no doubling, the combinatorial computation is conducted with the one-pair doubling, so that one of the partner weighing machines selected in the optimum combination is subjected to a zero-point adjustment in a subsequent cycle. At this time, the partner weighing machine paired with that having its zero point adjusted is also made not to participate in the subsequent combinatorial computation. In other words, the second embodiment is different from the foregoing first embodiment in that the pattern without doubling is made preferential to reduce the chance of causing the doubled discharge, and in that the paired two weighing machines, (one of which is being subjected to the zero-point adjustment), are made nonparticipants in the subsequent combinatorial computation after a doubled discharge so that the restoration of the weighing machines is made early and reliably. The second embodiment is characterized in that the number of weighing machines participating in the combinatorial computation is ten or twelve.

Figure 8A:
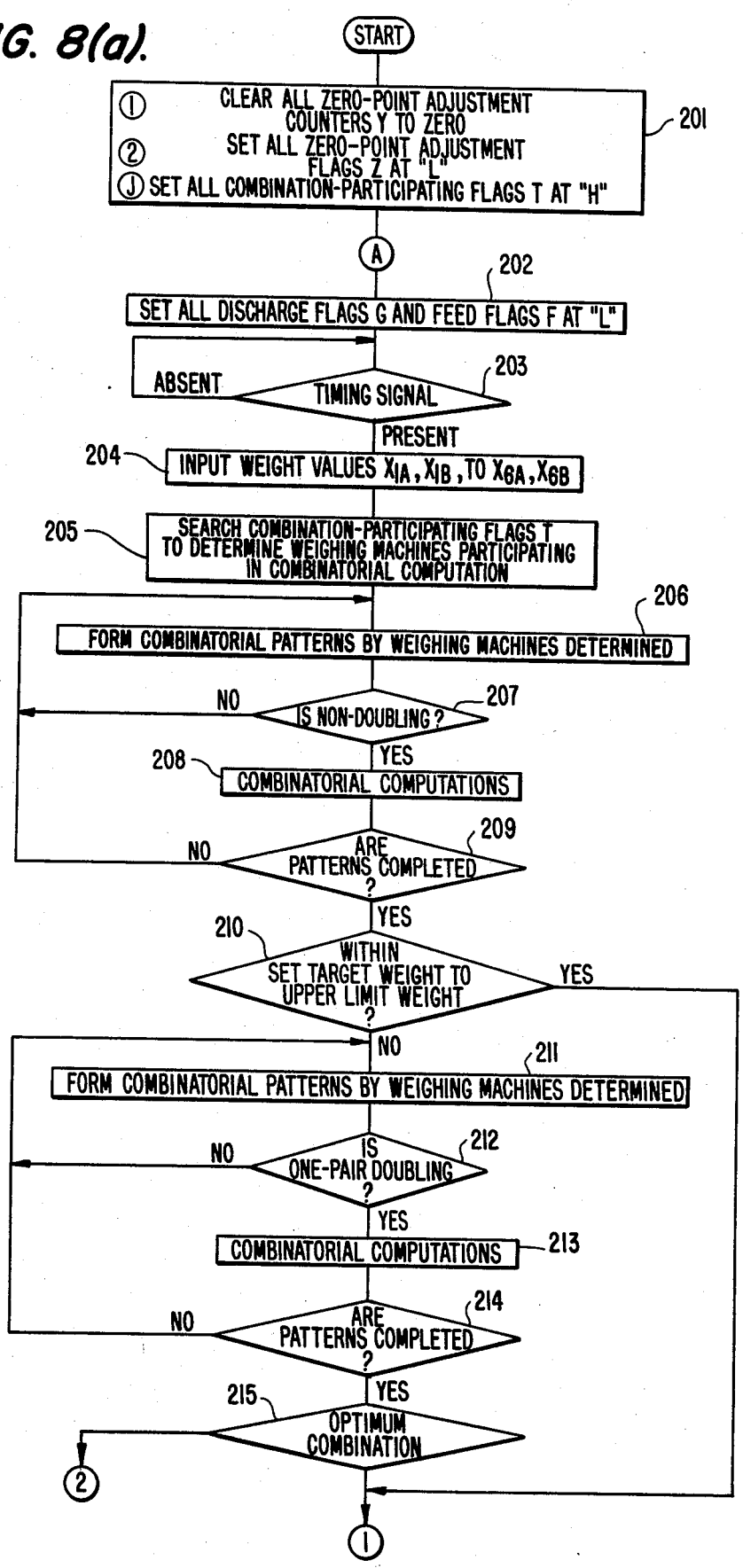
Figure 8B:
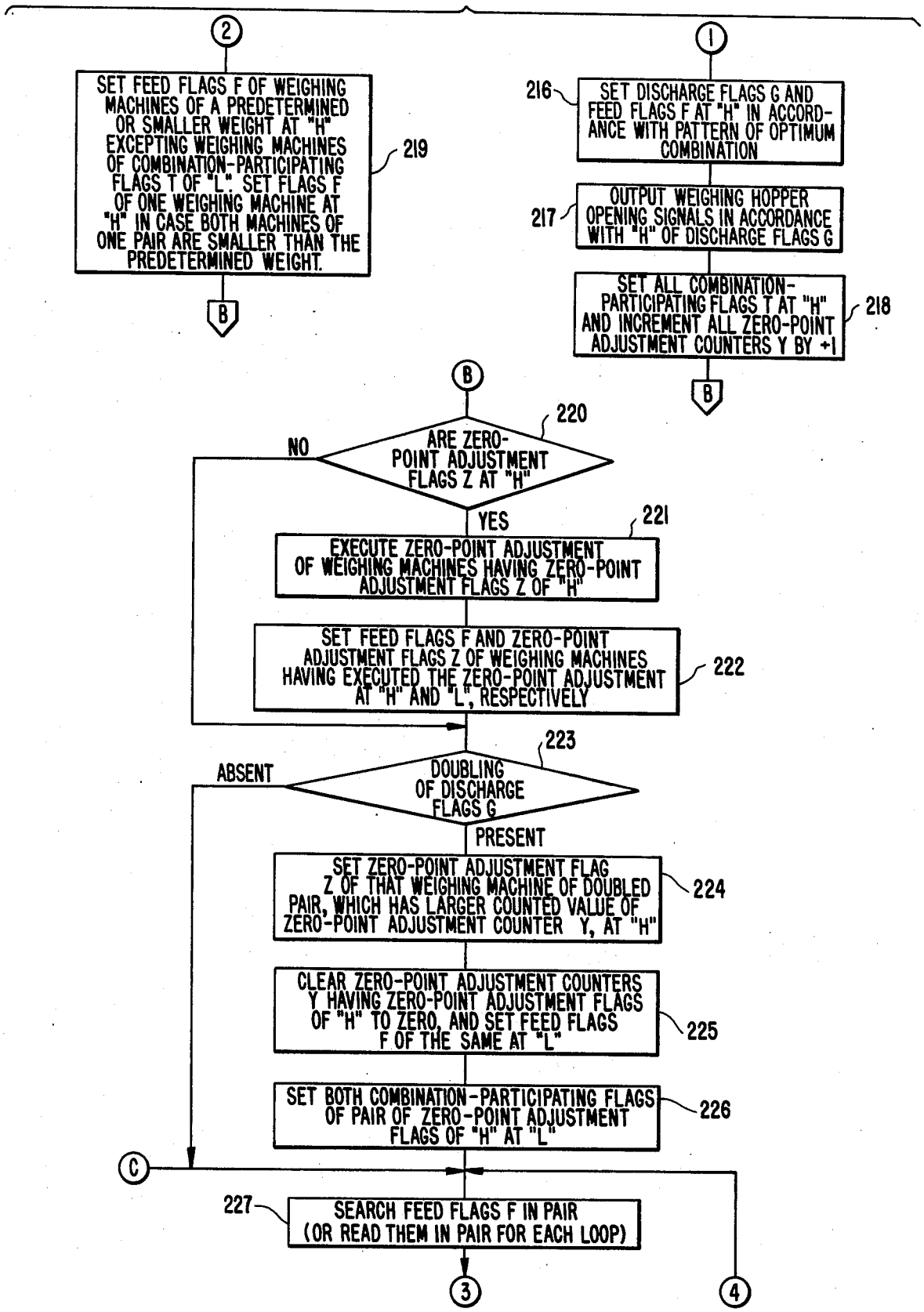
Figure 8C:
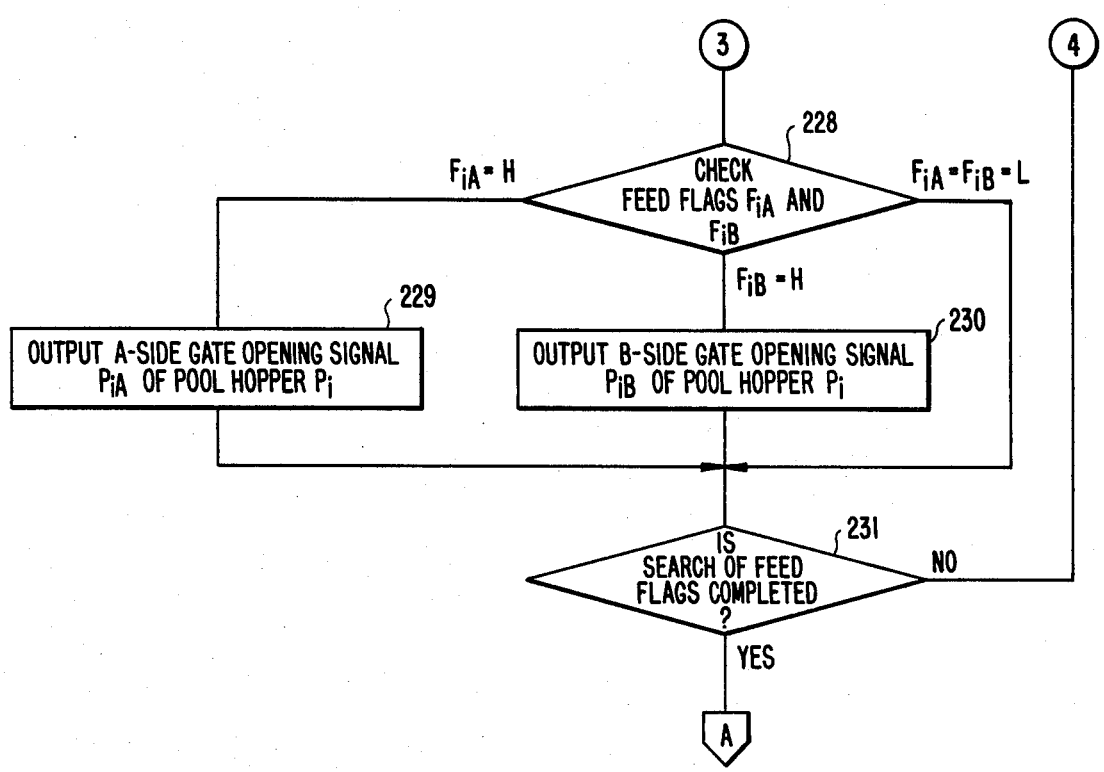

FIG. 8 is a flow chart for explaining the processing of the second embodiment, which will be described in the following with reference to the flow chart.

(1) Steps 201 to 206:

The computation control unit 5 executes the same processings at the steps 201 to 206 as those of the foregoing first embodiment. At step 206, however, the control unit 5 forms, as the combination pattern: the all the combination patterns that are made by the ten or twelve weighing machines.

(2) Steps 207 to 209:

The computation control unit 5 selects only the patterns including only one weighing machine from a pair, from all the combination patterns of the weighing machines, and conducts the combinatorial computations of all the patterns having no doubling.

(3) Step 210:

The computation control unit 5 compares the total combined weight value of the combinatorial computations, which is determined at the step 208, with the target weight value to check whether or not the optimum combination is present. As the optimum combination in this case, the control unit 5 selects the combination, in which the total combined weight value is between the set target value and the upper limit weight value, thereby to loosen the conditions. The control unit 5 advances to a step 216 when the optimum combination is present, and executes the step 211 and later steps in its absence.

(4) Steps 211 to 215:

The computation control unit 5 checks whether or not the combination pattern of the one-pair doubling, (i.e. patterns which include two weighing machines from the same pair), is present in all the aforementioned patterns, and executes the combinatorial computations of all the patterns with one-pair doubling. After these combinatorial computations of all the patterns with one-pair doubling are completed, the control unit 5 checks whether or not the optimum combination is present.

(5) Steps 216 to 219:

In the presence of the optimum combination, the computation control unit 5 sets both the discharge flags G and the feed flags F at "H" in accordance with the pattern of the optimum combination and outputs an opening signal q for opening the weighing hoppers of the weighing machines having the discharge flags G at "H". Subsequently, the control unit 5 sets all the combination-participating flags T at "H" and increments all the zero-point adjustment counters Y by +1. In the absence of the optimum combination, on the contrary, the computation control unit 5 sets to H the feed flags of the weighing machines having weights equal to or smaller than a predetermined weight. Incidentally, the weighing machines having the combination-participating flags T of "L" are excluded, and, in case both the partners of one pair have a weight equal to or smaller than the predetermined value, the feed flag F of one partner, (e.g., the weighing machine having a smaller weight) is set at "H".

(6) Steps 220 to 223:

The computation control unit 5 checks whether or not the zero-point adjustment flags Z are at "H", and executes the zero-point adjustments of the weighing machines having the zero-point adjustment flags Z at "H". Then, the control unit 5 sets the feed flags F of the weighing machines having their zero points adjusted to "H" in preparation for the subsequent supply of articles, and sets their zero-point flags Z at "L". Subsequently, the control unit 5 checks the doubling of the discharge flags G.

(7) Steps 224 to 226:

In case the discharge flags G are doubled, the computation control unit 5 sets to H the zero-point adjustment flag Z of the weighing machine of the doubled pair, which has its zero-point adjustment counter Y of a larger value. Then, the control unit 5 clears the zero-point adjustment counter Y corresponding to the zero-point adjustment flag Z of "H" to zero and sets the feed flag of the same at "L" so that no articles will be supplied in a subsequent cycle. Subsequently, the control unit 5 sets both the two combination-participating flags of the paired weighing machines having the zero-point adjustment flags of "H" at "L".

(8) Steps 227 to 231:

The computation control unit 5 reads and searches the feed flags F by pair for each loop of the program to check the feed flags $F_{iA}$ and $F_{iB}$. The control unit 5 outputs the opening signal $P_{iA}$ for opening the A-side gate of the pool hopper $P_i$ when the feed flag $F_{iA}$ is at "H" and the opening signal $P_{iB}$ for opening the B-side gate of the pool hopper $P_i$ when the feed flag $F_{iB}$ is at "H". In case both the gate opening signals $P_{iA}$ and $P_{iB}$ are at "L", however, the control unit 5 leaves the pool hoppers unoperated. If the search of the feed flags is completed, the computation control unit 5 returns to Ⓐ to repeat the processing described above.

Thus, in the second embodiment, the combinatorial computations are executed first without doubling to select the weighing machines for the optimum combination, thereby to discharge the articles without doubling; and subsequently computations are carried out with one-pair doubling when the optimum combination is not obtained. As a result, the frequency of occurrence of doubled discharges is made lower than that of the first embodiment.

[III] Third Embodiment

According to the foregoing first embodiment, only the weighing machine to be subjected to the zero-point adjustment is made not to participate in the subsequent combinatorial computation, so that reduction in the number of the subsequent combinatorial combinations is minimized.

Despite this feature, the first embodiment has a defect in that one pair has its restoration delayed if its weighing machines are continuously selected for the optimum combinations after the doubled discharge, as has been described hereinbefore, although the frequency with which this occurs is low.

The third embodiment contemplates making the restoration early and reliable while sacrificing the number of the subsequent combinations more or less. Contrast to the first embodiment in which only the weighing machine to be subjected to the zero-point adjustment after the doubled discharge is made a nonparticipant in the subsequent cycle, the partner weighing machine paired with the former one (i.e., the machine to be subjected to zero-point adjustment) is also nonparticipating in the subsequent combinatorial computation. In this regard, the third embodiment is similar to the second embodiment, so that the number of participants is either ten or twelve.

The flow chart of the this third embodiment is substantially shared with those of the foregoing first and second embodiments and is accordingly omitted here.

FIG. 9 presents the operational flows of the first to third embodiments comparatively, and FIG. 10 is a table for explaining the differences in the characteristics among the embodiments.

As has been described hereinbefore, according to the first inventive concept of the present invention, when a combinatorial weighing method is to be conducted by using a computerized weighing apparatus having a plurality of pairs of weighing machines, the number of combinations to be computed in a subsequent cycle is prevented from being reduced, to improve the combinatorial weighing accuracy by allowing both weighing machines in a single pair to be selected for the optimum combination.

When the two partners of one pair are selected together in the optimum combination so that they are emptied of their articles, moreover, at least one of them is selected and made a nonparticipant in the subsequent combinatorial computation, so that its restoration can be promoted.

Since the weighing machine left nonpartipating has been subjected to the zero-point adjustment, still moreover, its zero-point adjustment can be rationally practical to provide an advantage that the computerized weighing operations can be made highly accurate and reliable.

One embodiment according to a second inventive concept of the present invention will be described with reference to FIGS. 11 to 14.

[IV] Fourth Embodiment

Figure 11:
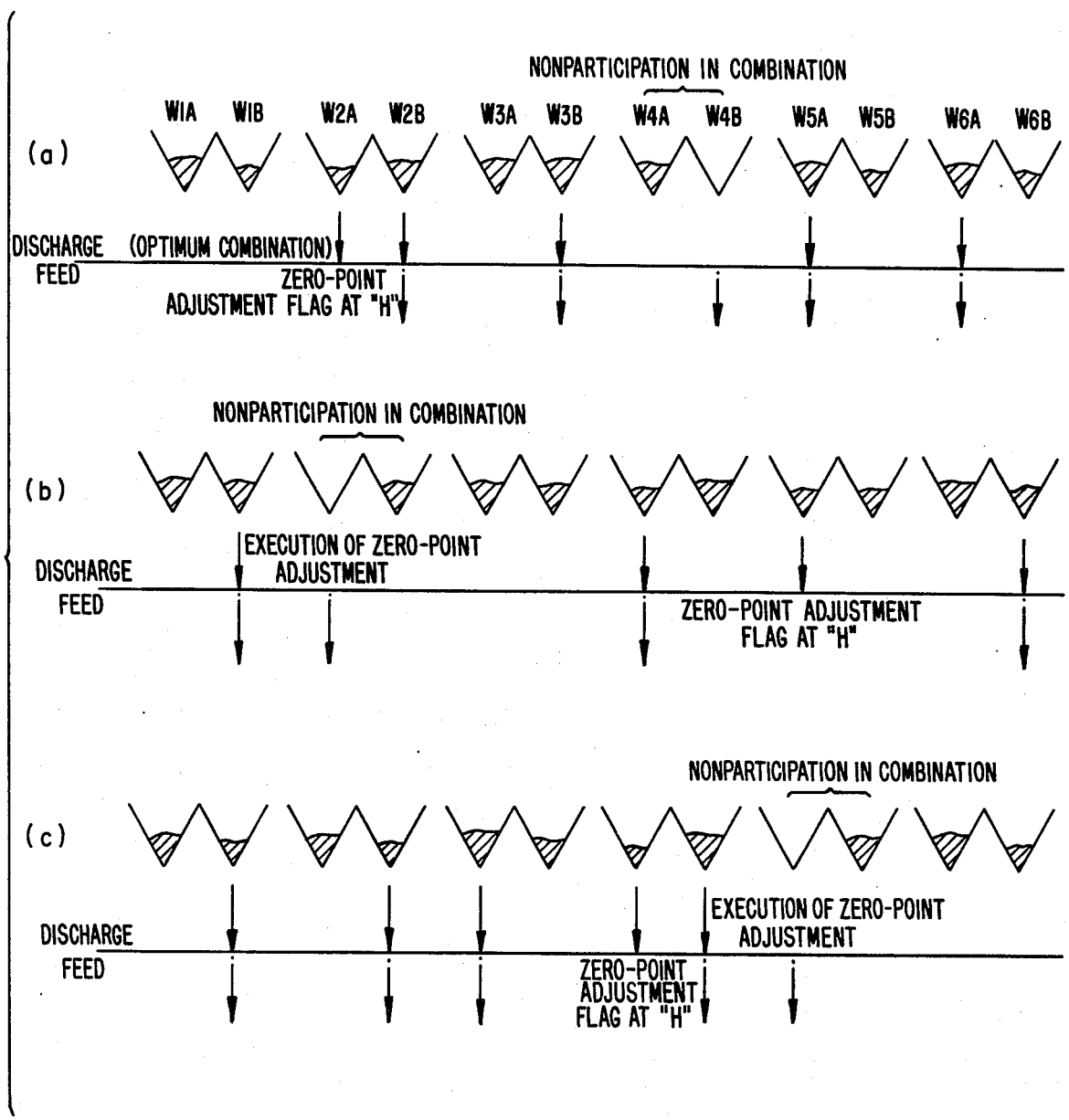

FIG. 11 is a diagram for explaining the operations of the fourth embodiment of the second inventive concept. In this embodiment, the description will be made by taking up as an example the arrangement in which the twelve weighing machines $W_{1A}$ to $W_{6B}$ are grouped into six pairs.

FIG. 11(a) shows an example with doubling, in which the paired weighing machines $W_{2A}$ and $W_{2B}$ are selected in the optimum combination. In this case, one partner $W_{2A}$ has its zero-point adjustment flag set at "H". In this example, both the weighing machine $W_{4B}$ which is to have its zero point adjusted and its partner machine $W_{4A}$ are nonparticipants so that the remaining ten weighing machines participate in the combination. FIG. 11(b) shows an example of the operations of the weighing machines, which are to be executed subsequent to those of FIG. 11(a). In this example, both the weighing machine $W_{2A}$ having its zero-point adjustment flag set previously at "H" and the partner machine $W_{2B}$ are made nonparticipants so that the number of participants is also ten in this case. On the other hand, this example corresponds to that without doubling, because there is no pair of weighing machines which are selected in the optimum combination. Of the weighing machines which have been selected in this cycle for the optimum combination so that they have discharged their articles, the machine $W_{5A}$ has its zero-point adjustment flag set at "H". FIG. 11(c) shows an example with doubling, in which the paired weighing machines $W_{4A}$ and $W_{4B}$ are selected in the optimum combination in a manner similar to the example of FIG. 11(a). One partner $W_{4A}$ has its zero-point adjustment flag set at "H". On the other hand, both the weighing machine $W_{5A}$ having its zero-point adjustment flag set previously at "H" and its partner $W_{5B}$ are made not to participate in the combinations of this cycle, so that the remaining ten weighing machines are the participants. The examples of the operations of FIG. 11 are summarized in Table 4:

TABLE 4

| No. | Doubling | Flag "H" | Adjustment | Nonparticipants | Participants |
|---|---|---|---|---|---|
| a | O | O | O | 2 | 10 |
| b | X | O | O | 2 | 10 |
| c | O | O | O | 2 | 10 |

Specifically, this fourth embodiment has the following features.

(1) The weighing machine which is to have its zero point adjusted is selected only from one pair having doubling, if any, so that it is subjected to the zero-point adjustment subsequently to the occurrence of the doubling pair. If there is no doubling, the weighing machine which is to have its zero-point adjusted is selected from those which have been selected previously for the optimum combination, so that they have been emptied of their articles, and, so that the the zero-point adjustment is always executed each cycle whether or not doubling occurs. (Reference should be made to the weighing machine $W_{5A}$ of FIG. 11(b).)

(2) That partner of the paired weighing machines, which is not subjected to the zero-point adjustment, is not made to participate in the subsequent combinations. Moreover, the nonparticipants in the subsequent combination are limited to only the paired two weighing machines, i.e., the machine having its zero point adjusted and its partner machine, so that the remaining ten weighing machines are always made to participate in the computations.

Figure 12A:
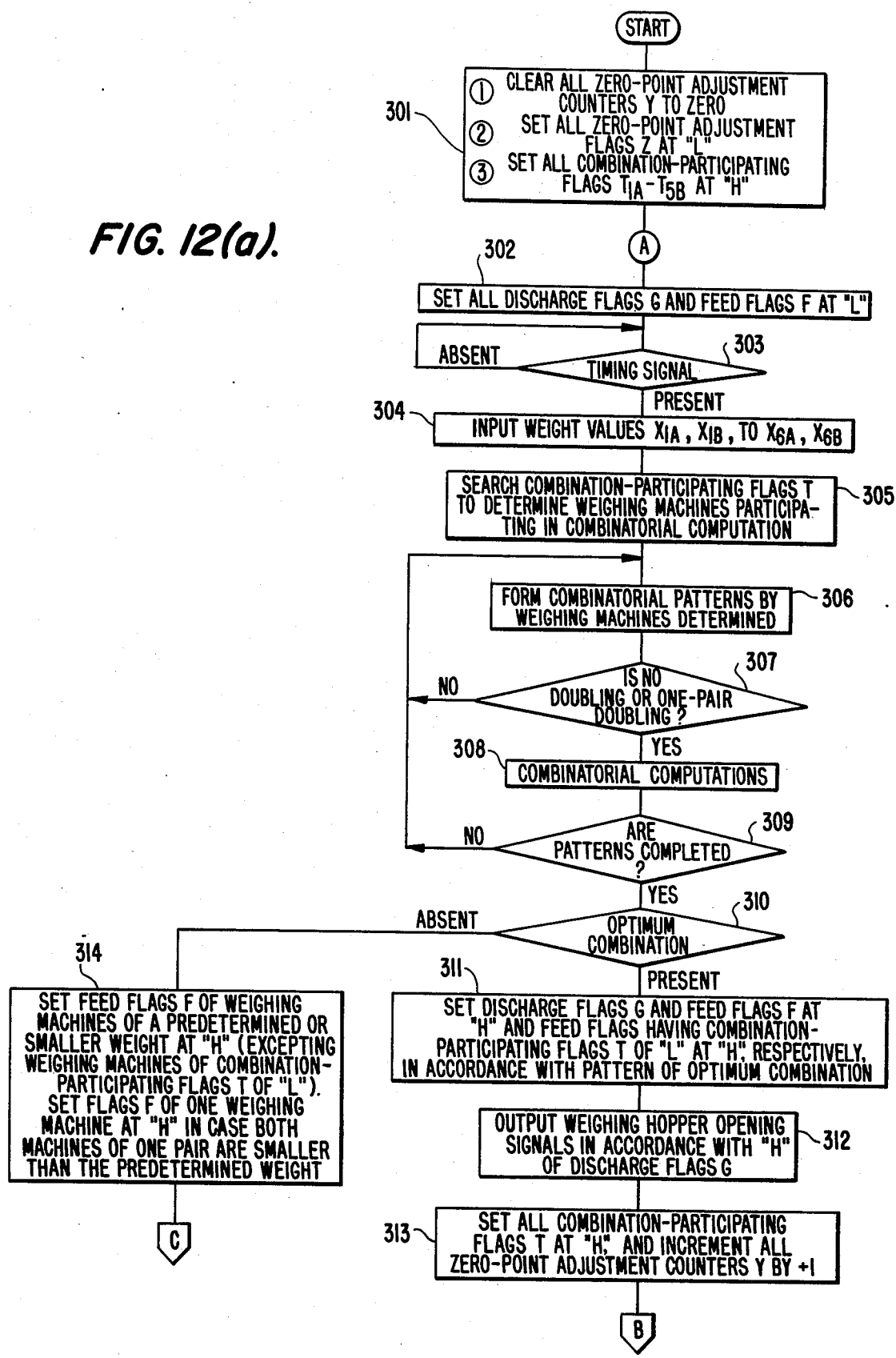

FIG. 12 is a flow chart for explaining the operations of the fourth embodiment. This embodiment will be described in the following with reference to the flow chart of FIG. 12.

(1) Step 301:
The computation control unit 5:
  ① Clears all the zero-point adjustment counters Y to zero;
  ② Sets all the zero-point adjustment flags Z at "L"; and
  ③ Sets all the combination-participating flags T at "H".

As a result, the combination-participating flags $T_{1A}$ to $T_{5B}$ are set at "H" whereas the remaining flags $T_{6A}$ and $T_{6B}$ are set at "L".

Now, the computerized weighing apparatus is set with the initial conditions for starting the combinatorial weighing operations.

(2) Step 302:
The computation control unit 5 sets all the discharge flags G and the feed flags at "L".

(3) Step 303:

The computation control unit 5 checks whether the timing signal from the packaging machine is inputted or not, and advances to a subsequent step if present.

(4) Step 304:

In response to the timing signal T, the computation control unit 5 feeds the start signal ST to input the respective weight value data $X_{1A}$ to $X_{6B}$ of the weighing machines $W_{1A}$ to $W_{6B}$ to the multiplexer 3 and through the A/D converter 4.

(5) Step 305:

The computation control unit 5 searches the combination-participating flags T to cause the weighing machines with the flags "H" to participate in the combinatorial computations. In the initial state, the ten weighing machines $W_{1A}$ to $W_{5B}$ participate in the computations. Incidentally, in the case of this embodiment, the number of weighing machines to participate in the computations is definite, as indicated in Table 4.

(6) Step 306:

The computation control unit 5 forms all the combination patterns that are composed of the weighing machines determined at the step 305.

(7) Step 307:

The computation control unit 5 checks for each combination, whether the combination includes non-doubling of the or one-pair doubling weighing machines from the respective pairs and advances to a subsequent step if the answer is YES.

(8) Step 308:

The computation control unit 5 executes the combinatorial computation for both the non-doubling and one-pair doubling combination patterns determined at the step 307 based on the weight value data of the weighing machines.

(9) Step 309:

The computation control unit 5 checks whether all the patterns have been subjected to the processings of the steps 306 to 308, and advances to a subsequent step if the answer is YES.

(10) Step 310:

The computation control unit 5 compares the combinatorial weight values determined by the combinatorial computations with a target weight value to check whether or not an optimum combination is present, and advances to a step 311 if present or to a step 314 if absent.

(11) Step 314:

In the absence of the optimum combination, the computation control unit 5 sets both the feed flags F and the combination-participating flags T at "H" so as to replenish the weighing machines having weight value data smaller than a predetermined value with articles. In this case, however, the control unit 5 excludes the weighing machines with the zero-point adjustment flags Z at "H" and sets the flag F at H and for one weighing machine of a pair having a smaller weight value, when for example, both machines of the pair have weight values smaller than the predetermined value.

(12) Step 311:

in the presence of the optimum combination, the computation control unit 5 sets the discharge flags G and the feed flags F of the corresponding weighing machines at "H" in accordance with the pattern of the optimum combination.

(13) Step 312:

The computation control unit 5 outputs the opening signals to the weighing hoppers of the weighing machines having the discharge flags G of "H"

(14) Step 313:

The computation control unit 5 sets all the combination-participating flags T at "H" and increments all the zero-point adjustment counters Y by +1.

(15) Step 315:

The computation control unit 5 checks each respective weighing machine as to whether any of the corresponding zero-point adjustment flags Z at "H", and advances to a step 316 if YES and to a step 318 if NO.

(16) Step 316:

The computation control unit 5 executes the zero-point adjustments of the weighing machines having the zero-point adjustment flags Z of "H" because those machines were selected for the optimum combination in the previous combinatorial weighing operation so that they have discharged their articles.

(17) Step 317:

The computation control unit 5 has subjected the zero-point adjustment of the weighing machine having the zero-point adjustment flag Z of "H" at the previous step 316, and sets the feed flag F of the weighing machine having its zero point adjusted at "H" and the zero-point adjustment flag Z of the same at "L", so that the weighing machine having its zero-point adjustment completed may be supplied subsequently with articles.

(18) Step 318:

The computation control unit 5 checks the doubling of the discharge flags G and advances to a step 319 in the presence and to a step 320 in the absence.

(19) Step 319:

The computation control unit 5 sets to H the zero-point adjustment flag Z of that weighing machine which has a larger counted value of the zero-point adjustment counter Y.

(20) Step 320:

The computation control unit 5 sets to H the zero-point adjustment flag Z of that weighing machine from those having the discharge flags G of "H", which has the maximum counted value of its zero-point adjustment counter Y.

(21) Step 321:

The computation control unit 5 clears the zero-point adjustment counter Y having the zero-point adjustment flag of "H", to zero and sets the feed flag F of the same at "L" to prohibit the corresponding weighing machine from being supplied with articles, so that the weighing machine may be subjected to the zero-point adjustment in the subsequent combinatorial weighing operation.

(22) Step 322:

The computation control unit 5 sets both the combination-participating flags of the paired weighing machines, one of which has the zero-point adjustment flag of "H", at "L" so that the paired two weighing machines may not participate in the subsequent combinatorial computation.

(23) Step 323:

The computation control unit 5 reads and searches the feed flags by pair for each loop of the program.

(24) Step 324:

The computation control unit 5 checks the feed flags $F_{iA}$ and $F_{iB}$.

(25) Steps 326 and 325:

When the feed flag $F_{iA}$ is at "H", the computation control unit 5 outputs the opening signal $P_{iA}$ for opening the A-side gate of the pool hopper $P_i$. When the feed flag $F_{iB}$ is at "H", on the other hand, the control unit 5 outputs the opening signal $P_{iB}$ for opening the B-side gate of the pool hopper $P_i$. In contrast, when both of the feed flags $F_{iA}$ and $F_{iB}$ are at "L", the control unit 5 outputs none of the opening signals for opening the pool hoppers.

(26) Step 327:

The computation control unit 5 checks whether or not the search of the feed flags is completed up to the flags $F_{6A}$ and $F_{6B}$, and repeats again the processing from the step 323 when the search is not completed. If YES, then, the control unit executes again processing by returning to Ⓐ.

The characteristics of the fourth embodiment are summarized in FIGS. 13 and 14.

As has been described hereinbefore, according to the second inventive concept of the present invention, when a combinatorial weighing method is to be conducted by using a computerized weighing apparatus having a plurality of pairs of weighing machines, the number of combinations to be computed in a subsequent cycle is prevented from being reduced (as it is in the foregoing first inventive concept) to improve the combinatorial weighing accuracy by allowing both the weighing machines of only one pair to be selected in the optimum combination.

When both weighing machines in a pair have been selected as part of the optimum combination so that they have discharged their articles, moreover, at least one of the partners is selected and subjected to zero-point adjustment in the subsequent combinatorial weighing operation, so that its zero-point adjustment can be rationally conducted.

Since the weighing machine to be subjected to the zero-point adjustment and its partner machine are made not to participate in the subsequent combinatorial computation, still moreover, the restoration of the weighing machine having its zero point adjusted is promoted. Furthermore, the frequency of the adjustments is increased by adjusting the indefinite and variable zero point of a weighing machine in each cycle, so that the zero point can be corrected before its variation is augmented.

FIGS. 15 to 20 show two embodiments (i.e., fifth and sixth embodiments) according to a third inventive concept of the present invention.

[V] FIFTH EMBODIMENT

FIG. 15 is a diagram for explaining the fifth embodiment of the third inventive concept. In this embodiment, the description will be made based upon an example of the arrangement in which the twelve weighing machines $W_{1A}$ to $W_{6B}$ are grouped into six pairs.

Figure 15A:
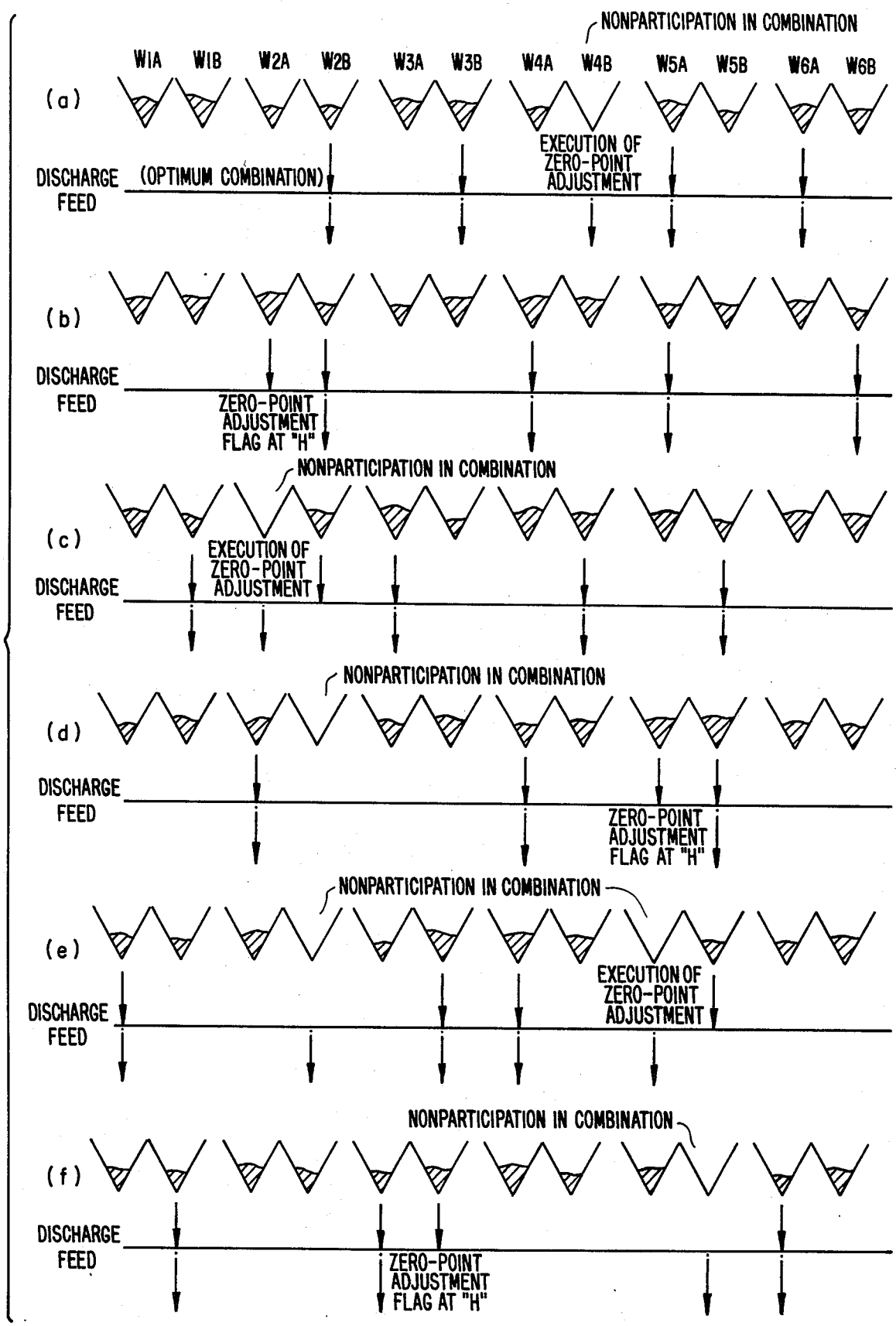
Figure 15B:
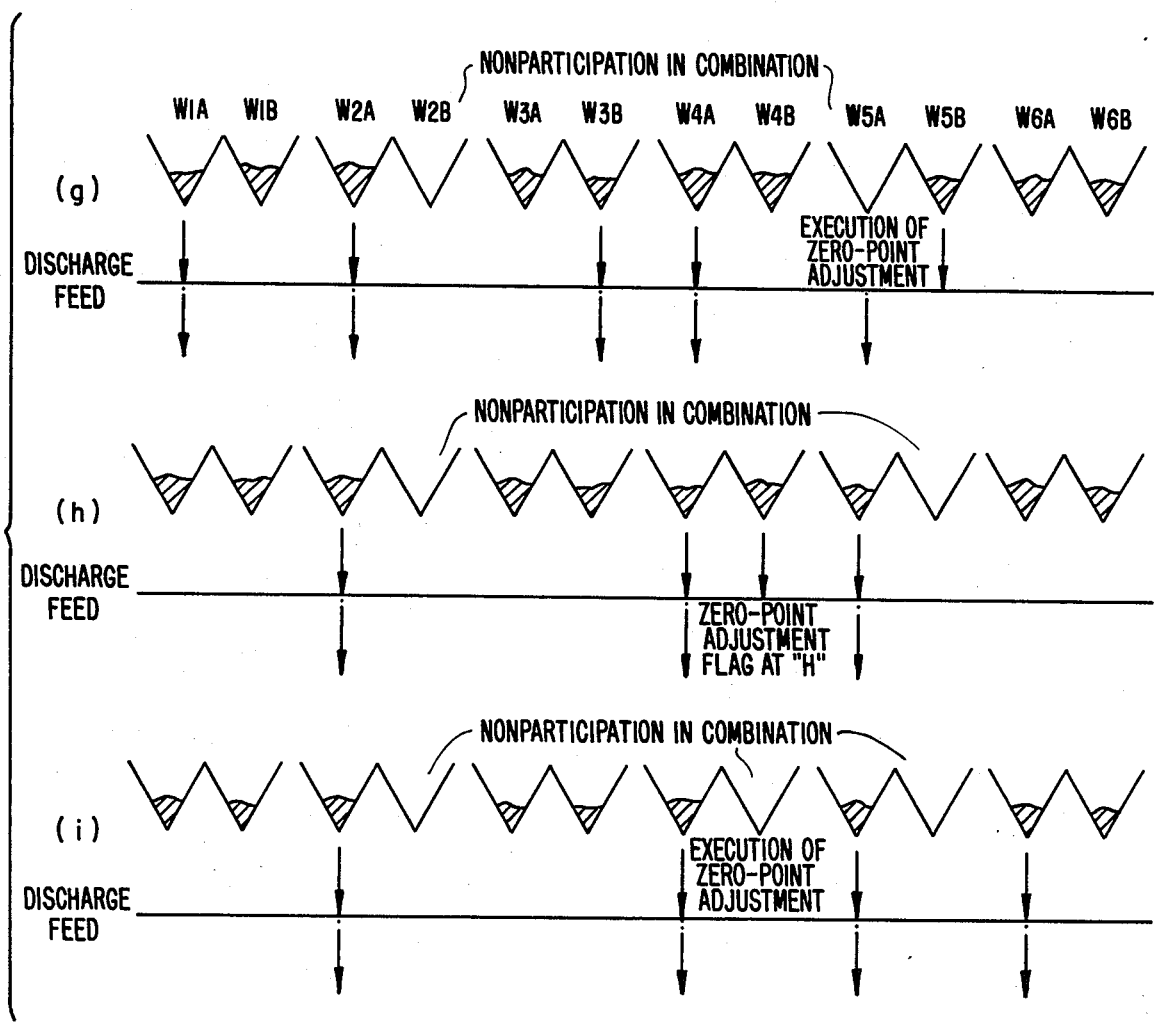

FIG. 15(a) shows an example in which eleven weighing machines (i.e., all machines except the machine $W_{4B}$ which is having its zero point adjusted) are made to participate in the computation without doubling FIG. 15(b) shows an example with doubling, in which the paired weighing machines $W_{2A}$ and $W_{2B}$ are selected in the optimum combination. One partner machine $W_{2A}$ has its zero-point adjustment flag set at "H". In this example, all all twelve machines participate in the combinatorial computation. FIG. 15(c) shows an example in which the weighing machine $W_{2A}$ (having its zero-point adjustment flag set previously at "H") is subjected to the zero-point adjustment, whereas the remaining eleven machines are made to participate in the computation without doubling in. FIG. 15(d) shows an example, in which the paired weighing machines $W_{5A}$ and $W_{5B}$ are doubly discharged whereas the weighing machine $W_{2B}$ is made a nonparticipant, so that the remaining eleven machines are made to participate in the combinatorial computation. In this case, one partner $W_{5A}$ of the weighing machines having which have been doubly discharged, has its zero-point adjustment flag set at "H". FIG. 15(e) shows an example of the discharge without doubling, in which not only the weighing machine $W_{5A}$ having its zero point adjusted but also the weighing machine $W_{2B}$ is made a nonparticipant, so that the remaining ten machines are made to participate in the combinatorial computation. FIG. 15(f) shows an example, in which the paired weighing machines $W_{3A}$ and $W_{3B}$ are doubly discharged and in which one partner $W_{3B}$ is set with the zero-point adjustment flag at "H". Since the weighing machine $W_{5B}$ is not one of the participants, the remaining eleven machines participate in the combinatorial computation. FIG. 15(g) shows an example of the discharge without doubling which is similar to that of FIG. 15(e). In this example, the weighing machine $W_{2B}$ in addition to the machine $W_{5A}$ having its zero point adjusted is made a nonparticipant, so that the remaining ten weighing machines are made to participate in the combinatorial computation. FIG. 15(h) shows an example with doubling discharge, in which the paired weighing machines $W_{4A}$ and $W_{4B}$ are discharged together before the weighing machines which have doubly discharged are recovered. As a result, the two weighing machines $W_{2B}$ and $W_{5B}$ are not participants, so that the remaining ten machines are made to participate in the combinatorial computation. FIG. 15(i) shows an example of discharge without doubling, in which the respective partners $W_{2A}$ and $W_{5A}$ of the nonparticipants $W_{2B}$ and $W_{5B}$ of FIG. 15(b) are selected in the optimum combination, so that the weighing machines $W_{2B}$ and $W_{5B}$ are not supplied with the articles. As a result, the nonparticipants in this cycle are limited to three weighing machines, i.e., the machines $W_{2B}$ and $W_{5B}$ and the machine $W_{4B}$ having its zero point adjusted in this cycle, so that the remaining nine machines participate in the combinatorial computation.

Thus, according to the feature of the fifth embodiment, whether or not doubling was present in the previous discharge is checked by means of a doubling discharge flag E so that, in the case of the double discharge in the previous cycle, the combinatorial computation in the present cycle is conducted with a pattern without doubling, thereby to reducing the probability of an increase in the number of empty weighing machines. In contrast, when the previous discharge take place without doubling, the combinatorial computation in the present cycle is conducted without doubling or with one-pair doubling.

The examples of the operations of FIGS. 15(a)-(f) are summarized in Table 5:

TABLE 5

| No. | Doubling | Flag "H" | Adjustment | Nonparticipants | Participants |
|---|---|---|---|---|---|
| a | X | X | O | 1 | 11 |
| b | O | O | X | 0 | 12 |
| c | X | X | O | 1 | 11 |
| d | O | O | X | 1 | 11 |
| e | X | X | O | 2 | 10 |

TABLE 5-continued

| No. | Doubling | Flag "H" Adjustment | Nonparticipants | Participants |
|---|---|---|---|---|
| f | O | O X | 1 | 11 |

Figure 16:
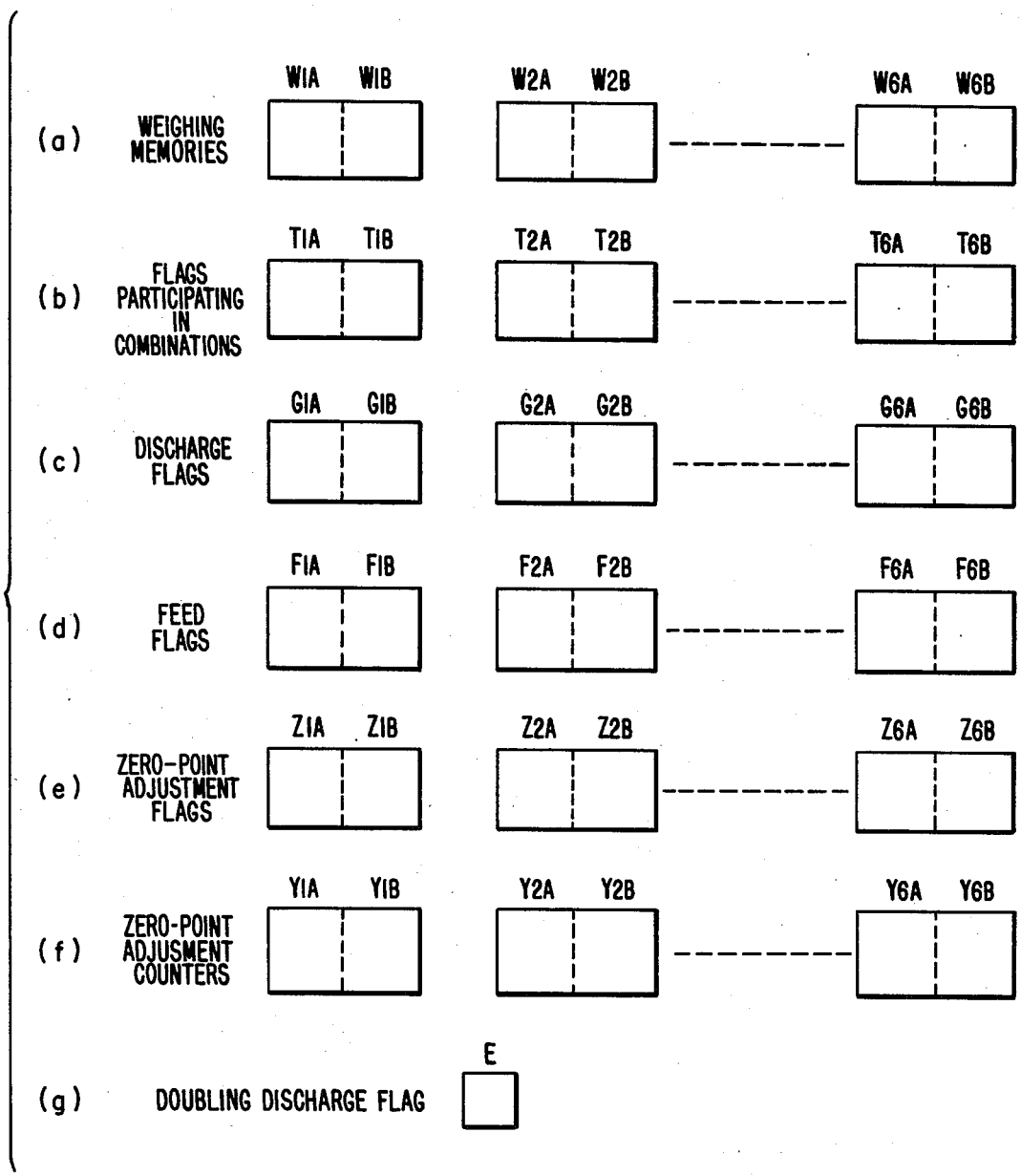

Next, examples of the memories to be used in the fifth embodiment will be described with reference to FIG. 16. The eight value memories of FIG. 16(a), the flags participating in the computations of FIG. 16(b), the discharge flags of FIG. 16(c), the feed flags of FIG. 16(d), the zero-point adjustment flags of FIG. 16(e) and the zero-point adjustment counters of FIG. 16(f) are made similar to those shown in FIG. 5. To the fifth embodiment, there is added the doubling discharge flag which is shown in FIG. 16(g). This doubling discharge flag E is set at "H" in the case of the double discharge in the previous cycle.

Figure 17A:
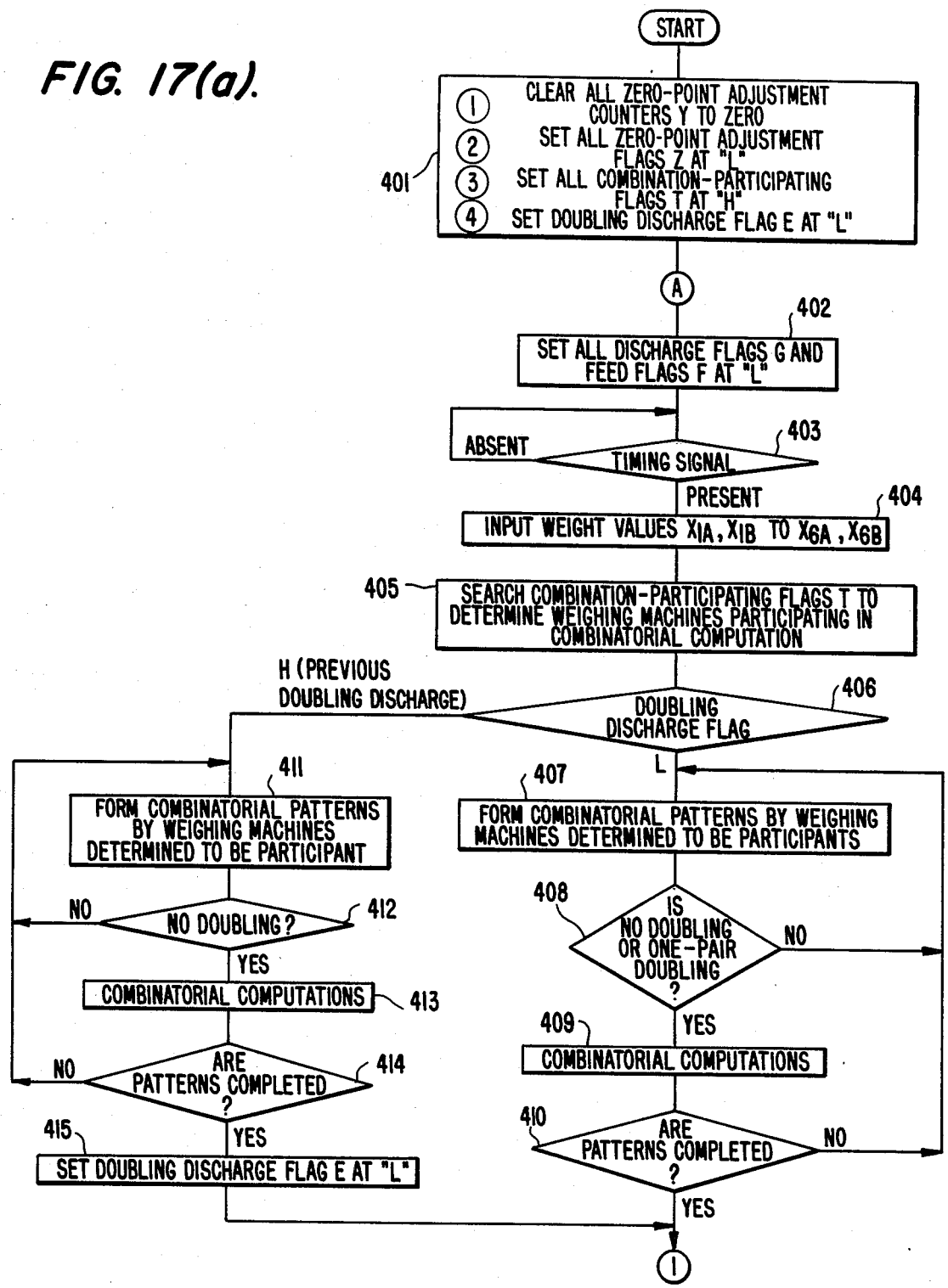
Figure 17B:
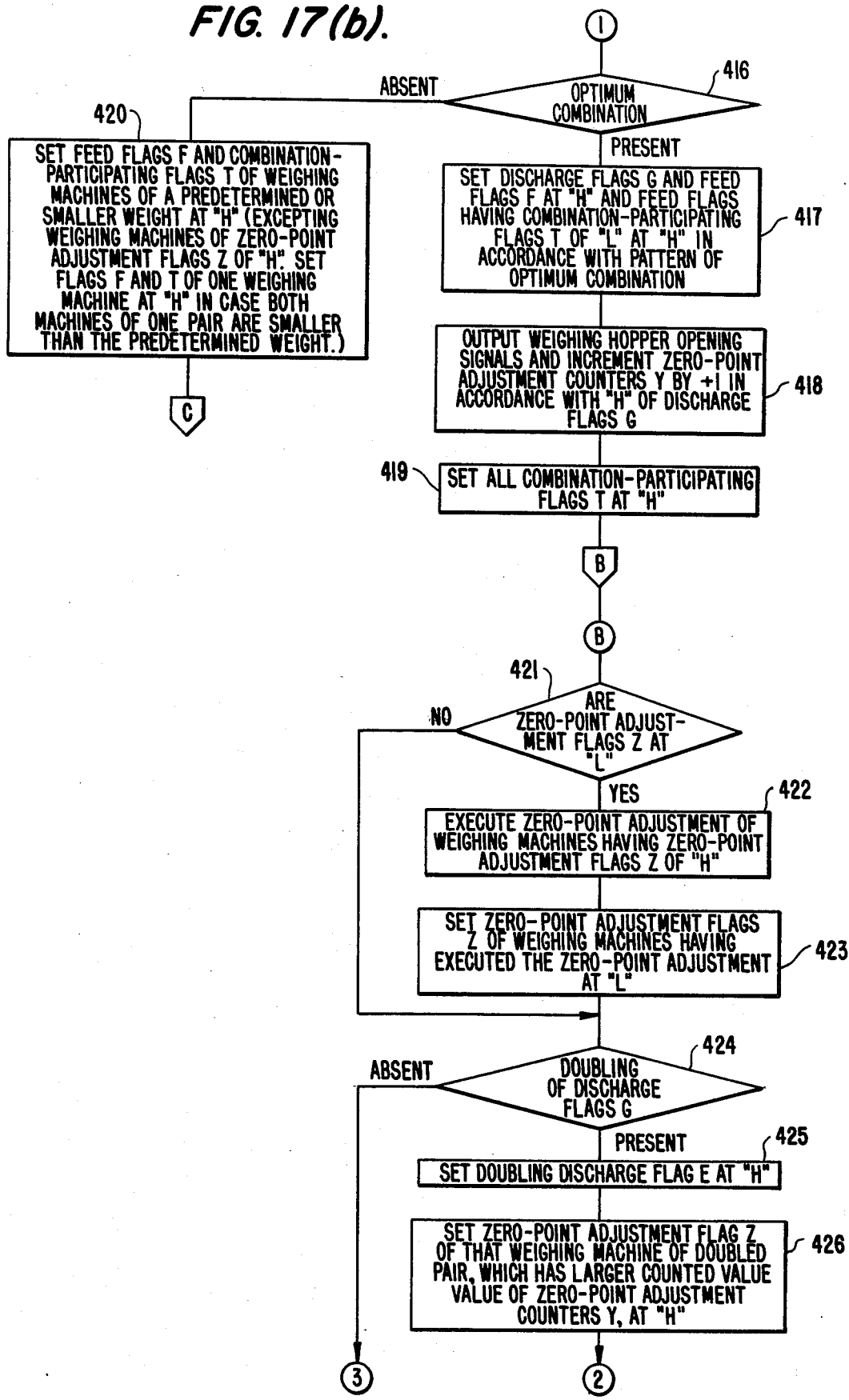
Figure 17C:
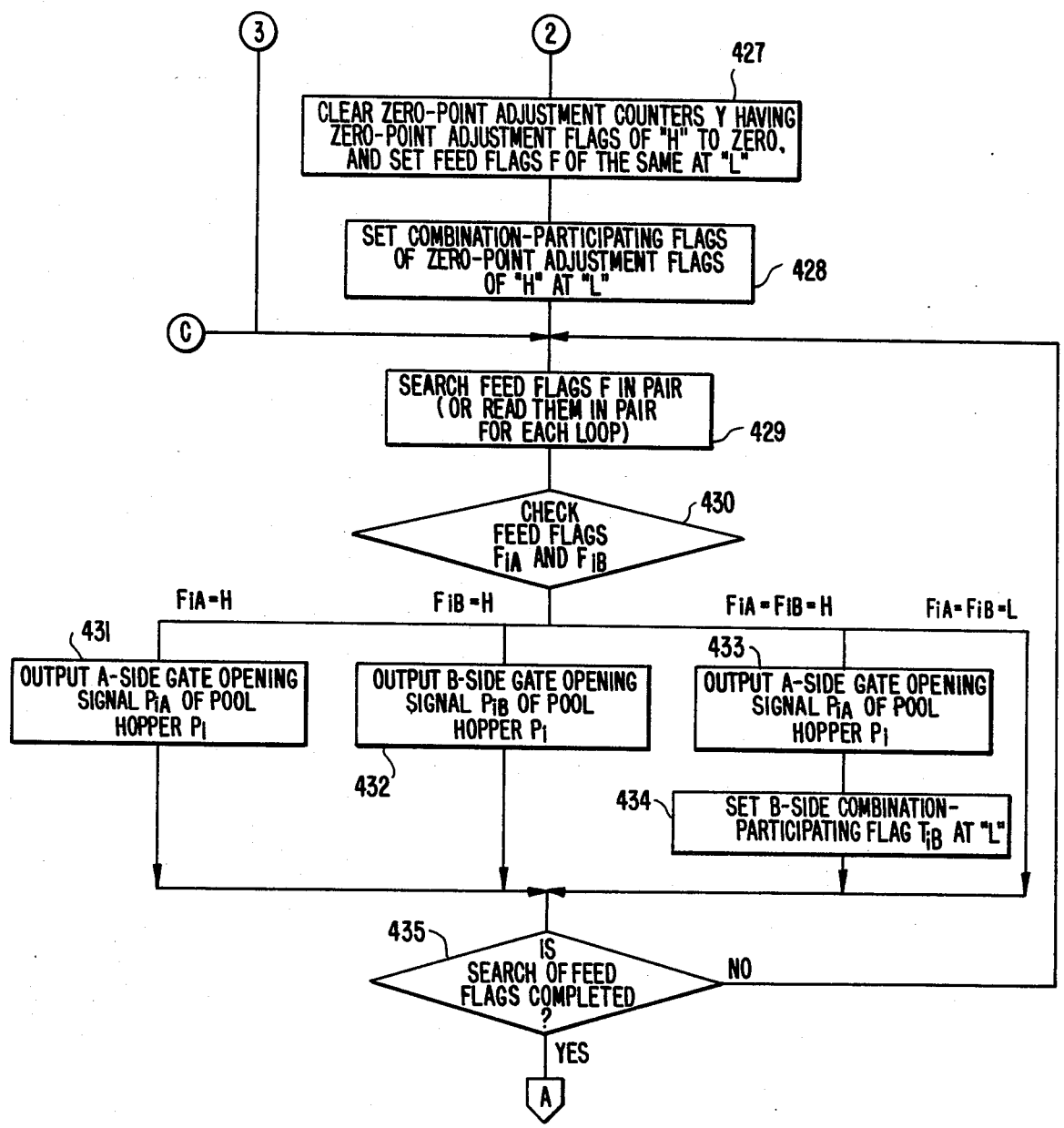

FIG. 17 is a flow chart for explaining the operations of the fifth embodiment. This embodiment will be described in the following with reference to the flow chart of FIG. 17.

(1) Step 401:
The computation control unit 5:
  ① Clears all the zero-point adjustment counters Y to zero;
  ② Sets all the zero-point adjustment flags Z at "L";
  ③ Sets all the combination-participating flags T at "H"; and
  ④ Sets the doubling discharge flag E at "L".
Now, the computerized weighing apparatus is set with the initial conditions for starting the combinatorial weighing operations.

(2) Step 402:
The computation control unit 5 sets all the discharge flags G and the feed flags at "L".

(3) Step 403:
The computation control unit 5 checks whether the timing signal from the packaging machine is inputted or not, and advances to a subsequent step if present.

(4) Step 404:
In response to the timing signal T, the computation control unit 5 feeds the start signal ST to input the respective weight value data $X_{1A}$ to $X_{6B}$ of the weighing machines $W_{1A}$ to $W_{6B}$ to the multiplexer 3 and through the A/D converter 4.

(5) Step 405:
The computation control unit 5 searches the combination-participating flags T to cause the weighing machines with the flags "H" to participate in the computations. In the initial state, all twelve weighing machines participate in the computations. Incidentally, in the case of this embodiment, the number of weighing machines to participate in the computations is indefinite, as enumerated in Table 5.

(6) Step 406:
The computation control unit 5 checks the doubling discharge flag to advance to a step 411 when that flag is in the "H" state because of the previous double discharge and to a step 407 when the flag is in the "L" state.

(7) Steps 411–415:
In the presence of the previous double discharge, the computation control unit 5 checks whether or not both weighing machines of one pair are doubly included together in a combination pattern, and selects only patterns without the doubling for the combinatorial computation. When the computations of all the patterns are completed, the control unit 5 sets the doubling discharge flag E at "L".

(8) Steps 407 to 410:
In the absence of the previous double discharge, the computation control unit 5 selects the patterns without doubling or with one-pair doubling from among the combination patterns to executes the combinatorial computations for all such patterns.

(9) Step 416:
The computation control unit 5 compares the combinatorial weight values determined by the combinatorial computations with a target weight value to check whether or not an optimum combination exists, and advances to a step 417 if present or to a step 420 if absent.

(10) Step 420:
In the absence of the optimum combination, an computation control unit 5 sets both the feed flags F and the combination-participating flags T at "H" so as to replenish with articles the weighing machines having weight value data smaller than a predetermined value. In this case, however, the control unit 5 excludes the weighing machines with the zero-point adjustment flags Z at "H" and sets the flag F and T at H for one weighing machine of a pair having a smaller weight value, when for example, both machines of the pair have weight values smaller than the predetermined value.

(11) Step 417:
In the presence of the optimum combination, the computation control unit 5 sets the discharge flags G and the feed flags F of the corresponding weighing machines at "H" in accordance with the pattern of the optimum combination and sets the feed flags corresponding to the weighing machines having the combination-participating flags T of "L" at "H".
In this case, as shown in FIG. 15(e), there may be present a weighing machine which has its combination-participating flag at "L" despite the fact that all the zero-point adjustment flags are at "L".

(12) Step 418:
The computation control unit 5 outputs the opening signals to the weighing hoppers of the weighing machines having the discharge flags G of "H", and increments the zero-point adjustment counters Y corresponding to the weighing machines having the discharge flags of "H" by +1. In other words, the computation control unit 5 counts the number of discharges for each weighing hopper.

(13) Step 419:
The computation control unit 5 sets all the combination-participating flags T at "H".

(14) Step 421:
The computation control unit 5 checks the weighing machines to determine whether the zero-point adjustment flags Z are at "H", and advances to a step 422 if YES and to a step 424 if NO.

(15) Step 422:
The computation control unit 5 executes the zero-point adjustments of the weighing machines having the zero-point adjustment flags Z of "H" because those machines were selected for the optimum combination in the previous combinatorial weighing operation, so that they discharged their articles.

(16) Step 423:
The computation control unit 5 sets to "L" the zero-point adjustment flags Z of the weighing machine for which the zero-point adjustments have been executed. At this time, the feed flags F of those weighing machines are set at "H" at the step 417 so that they are prepared for the state in which they are to be supplied with the articles in the subsequent combinatoiral weighing operation.

(17) Step 424:

The computation control unit 5 checks for the doubling of the discharge flags G $G_{iA}$ and $G_{iB}$ and advances to a step 429 in the absence and to a step 425 in the presence.

(18) Step 425:

In case the discharge flags G are doubled, the computation control unit 5 sets the doubling discharge flag at "H".

(19) Step 426:

The computation control unit 5 sets to "H" the zero-point adjustment flag Z of that weighing machine of the doubled pair, which has a larger counted value of the zero-point adjustment counter Y, i.e., which has conducted the discharge more times.

(20) Step 427:

The computation control unit 5 clears the zero-point adjustment counters Y corresponding to the weighing machines having the zero-point adjustment flags of "H", to zero and sets the feed flags F of those weighing machines at "L" so that the machines may be prohibited from being supplied and may be subjected to the zero-point adjustment in the subsequent combinatorial weighing operations.

(21) Step 428:

The computation control unit 5 sets the combination-participating flags of the weighing machines having the zero-point adjustment flags of "H" at "L", so that those weighing machines may not participate in the subsequent combinatorial computations.

(22) Step 429:

The computation control unit 5 reads and searches the feed flags F in pair for each loop of the program.

(23) Step 430:

The computation control unit 5 checks the feed flags $F_{iA}$ and $F_{iB}$.

(24) Step 431:

The computation control unit 5 outputs the A-side gate opening signal $P_{iA}$ of the pool hopper P for a weighing machine having the feed flag $F_{iA}$ of "H".

(25) Step 432:

The computation control unit 5 outputs the B-side gate opening signal $P_{iB}$ of the pool hopper $P_i$ of the weighing machine having the feed flag $F_{iB}$ of "H".

(26) Step 433:

When both the feed flags $F_{iA}$ and $F_{iB}$ are at "H" (i.e., when both the weighing machines of a common pair are empty and are not subjected to the zero-point adjustment), the computation control unit 5 outputs the A-side gate opening signal $P_{iA}$ of the pool hopper $P_i$ of the corresponding weighing machines.

(27) Step 434:

Subsequently to the step 433, the computation control unit 5 sets the B-side combination-participating flag $T_{iB}$ of the corresponding weighing machines at "L".

(28) Step 435:

The computation control unit 5 checks whether or not the search of the feed flags is completed, and executes again the processing from Ⓐ if YES and returns to the step 429 to repeat the subsequent processing if NO.

[V] SIXTH EMBODIMENT

The foregoing embodiment has the problem shown in FIGS. 15(g) to (i), although the frequency of occurrence is low. Specifically, as shown in FIG. 15(g), since the discharges from the partners of the respective pairs continue despite the fact that they are conducted without doubling, the weighing machine $W_{2B}$ is not recovered yet so that the two weighing machines $W_{2B}$ and $W_{5A}$ are nonparticipants. Turning to FIG. 15(h) showing the example with the double discharge, in which the paired weighing machines $W_{4A}$ and $W_{4B}$ are emptied, the two weighing machines $W_{2B}$ and $W_{5B}$ are made not to participate in the combinatorial computation. Now, if the weighing machines $W_{2A}$ and $W_{5A}$ which are paired with their partners $W_{2B}$ and $W_{5B}$ (which have failed to participate in the weighing operation in this cycle), are continuously selected in the optimum combination in the subsequent cycle, as shown in FIG. 15(i), the non-participants are the weighing machines $W_{2B}$, $W_{4B}$ and $W_{5B}$, so that the number of nonparticipants is increased deteriorating the optimum combination accuracy.

Figure 18:
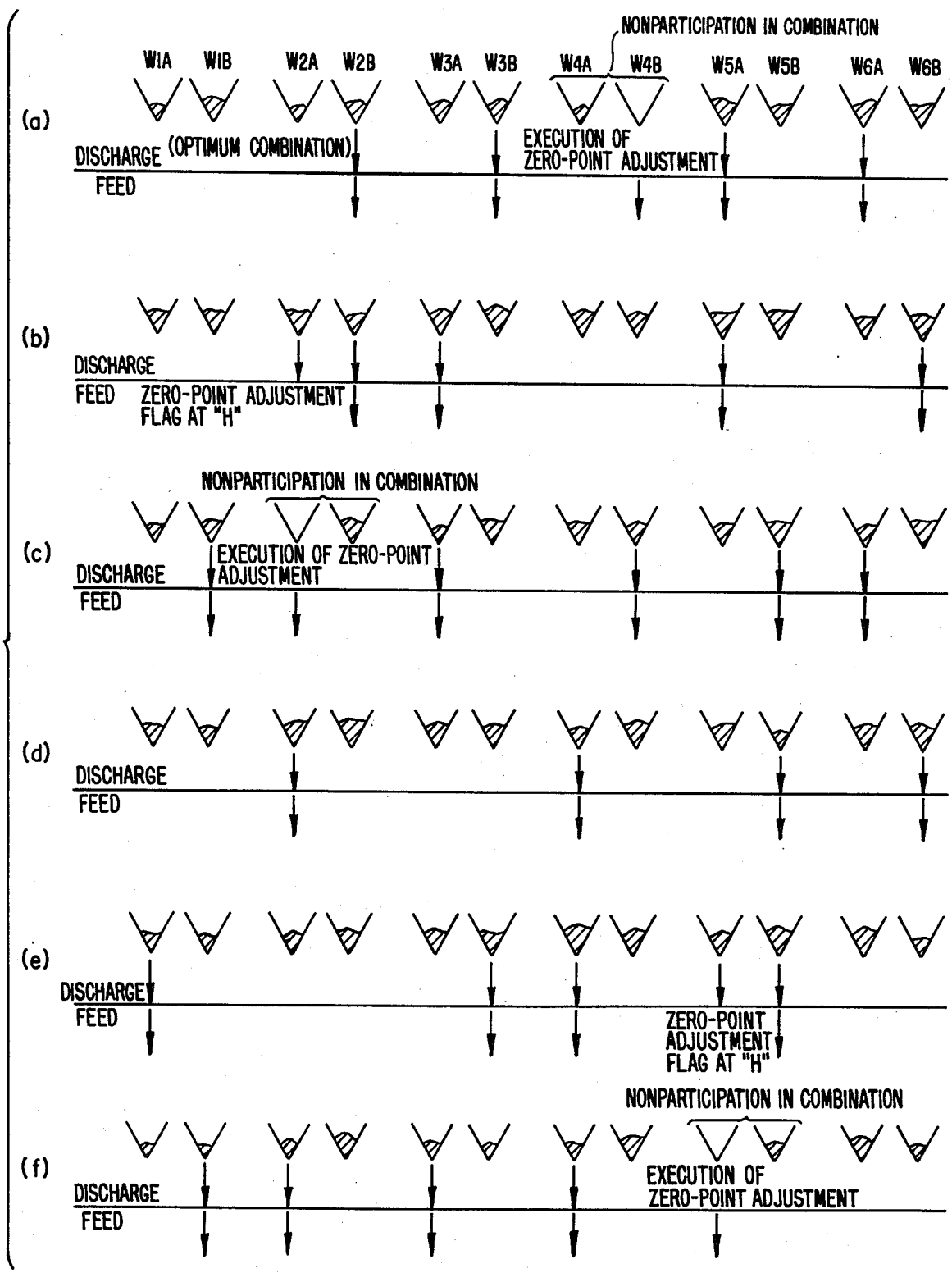

With this problem in mind, therefore, in the sixth embodiment shown in FIG. 18, both machines in a pair of weighing machines are caused, not to participate in the subsequent combinatorial computation when they are both emptied (FIG. 18(b)), as shown in FIG. 18(c), so that the number of non-participants may not be increased to three or more. Thus, the partner weighing machines paired with the weighing machines to be subjected to the zero-point adjustments are left nonparticipating, so that the restoration of the emptied weighing machine may be promoted.

Figures 19, 20:
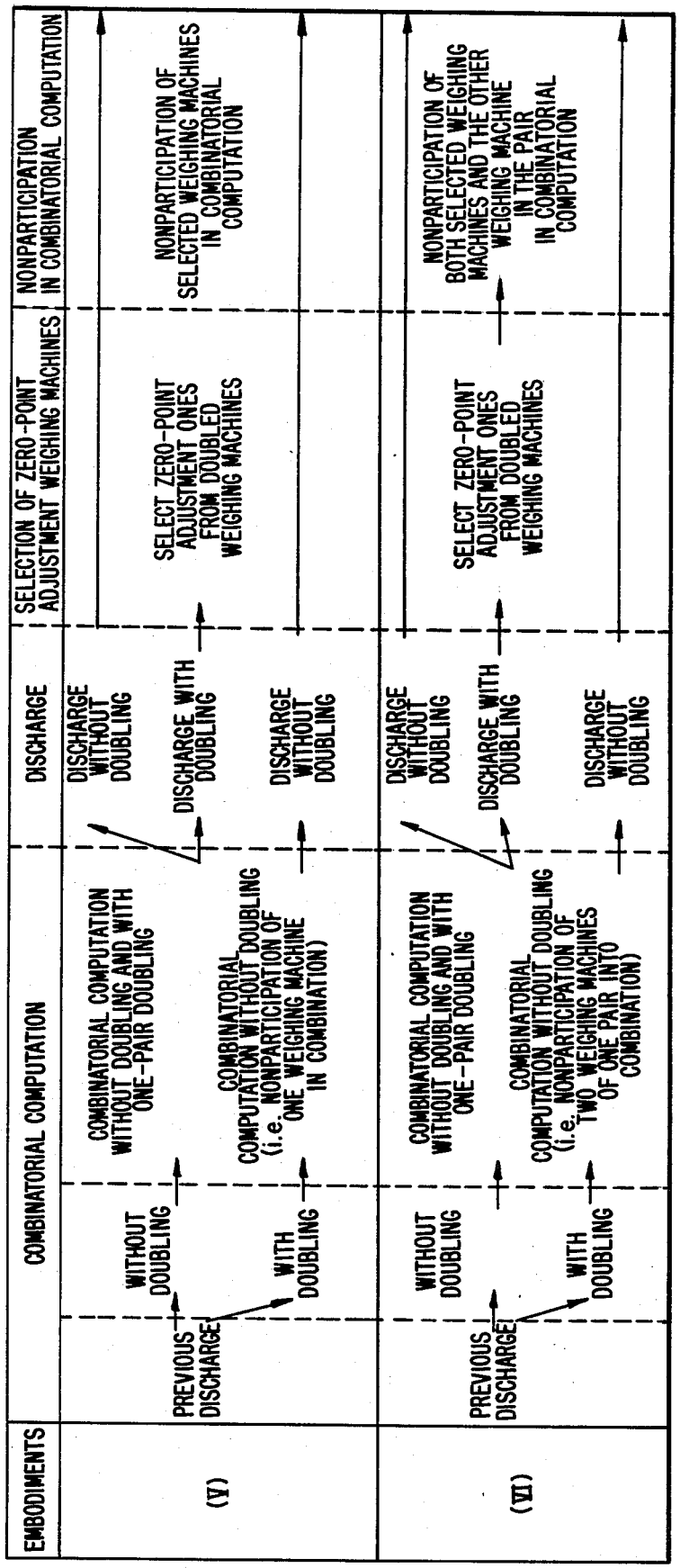

The characteristics of the fifth and sixth embodiments are compared with reference to FIGS. 19 and 20.

As has been described hereinbefore, according to the third inventive concept of the present invention, whem a combinatorial weighing method is to be conducted by using a computerized weighing apparatus having a plurality of pairs of weighing machines, as with the foregoing first and second inventive concepts, the number of combinations to be computed in a subsequent cycle is prevented from being reduced improving the combinatorial weighing accuracy by allowing both weighing machines in a pair to be selected in the optimum combination.

Moreover, whether or not the double discharge of one pair of two weighing machines is conducted in the previous combinatorial weighing operation is determined in the computation for the optimum combination as a result the optimum combination is selected exclusively from combinations with no doubling in the cycle subsequent to the double discharge to prevent the double discharges from continuously occurring, thereby to promoting the restoration of the weighing machines.

Since a weighing machine does not to participate in the computation and is subjected to the zero-point adjustment only in the cycle subsequent to the double discharge, the zero-point adjustments of the weighing machines can be rationally conducted to provide an advantage that the computerized weighing operations can be performed highly accurately and reliably.

What is claimed is:

1. A combinatorial weighing method for a computerized weighing apparatus including a plurality of pairs of weighing machines for weighing articles supplied thereto and for providing weight value data, and a computation control unit for computing combinations of weight values on the basis of the respective weight value data of the weighing machines to select an optimum combination of the weighing machines, which gives a total combined weight value equal to or closest to a target weight value, and to control the discharge of the articles from the weighing machines corresponding to the optimum combination, said combinatorial weighing method comprising the steps of:

(a) selecting combination patterns which include only one of the two weighing machines in any one pair, and combination patterns which include both weighing machines of a pair for a single one of the pairs;

(b) computing the total combined weight values on the basis of the combination patterns selected in said step (a), and determining the optimum combination; and (c) a subsequent combinatorial computation with the weighing machines except for at least one of the two weighing machines in a selected pair when both weighing machines are selected together in the optimum combination at said step (b), and executing a zero-point adjustment on the at least one excepted weighing machine.

2. A combinatorial weighing method according to claim 1, wherein said step (c) includes a sub-step of selecting either of the two weighing machines in the selected pair to execute the subsequent combinatorial computation, excepting only the other one of the pair and performing the zero-point adjustment on the other one of the pair.

3. A combinatorial weighing method according to claim 1, wherein said step (c) includes a sub-step of executing the subsequent combinatorial computation while excepting both of the weighing machines in the selected pair, and performing the zero-point adjustment on one of the pair.

4. A combinatorial weighing method according to claim 1, wherein said step (b) includes determining the optimum combination by first executing the computation of the total combined weight values for the combination patterns including only one of the two weighing machines in any one pair, and subsequently executing the computation with the combination patterns including both weighing machines of a pair for a single pair when the combination patterns including only one of the two weighing machines, fail to provide an optimum combination.

5. A combinatorial weighing method for a computerized weighing apparatus including a plurality of pairs of weighing machines for weighing articles supplied thereto and for providing weight value data, and a computation control unit for computing combinations of weight values on the basis of the respective weight value data of the weighing machines, to select an optimum combination of the weighing machines, which gives a total combined weight value equal to or closest to a target weight value, and to control the discharge of the articles from the weighing machines corresponding to the optimum combination, and combinatorial weighing method comprising the steps of:

(a) selecting combination patterns which include only one of the two weighing machines in any one pair, and combination patterns which include both weighing machines of a pair for a single one of the pairs;

(b) computing the total combined weight values on the basis of the combination patterns selected in said step (a), and determining the optimum combination; and (c) executing a zero-point adjustment for one of the weighing machines selected as part of the optimum combination in said step (b) during a subsequent combinatorial computation, and executing the subsequent combinatorial computation excepting the one selected weighing machine and the other weighing machine with which the one selected weighing machine is paired.

6. A combinatorial weighing method according to claim 5, wherein said step (c) includes a sub-step of selecting one of the paired weighing machines selected as part of the optimum combination and emptied of articles, to execute the zero-point adjustment when one of the combination patterns including both weighing machines from a single pair, is selected as the optimum combination.

7. A combinatorial weighing method for a computerized weighing apparatus including a plurality of pairs of weighing machines for weighing articles supplied thereto and for providing weight value data, and a computation control unit for computing combinations of weight values on the basis of the respective weight value data of the weighing machines, to select an optimum combination of the weighing machines, which gives a total combined weight value equal to or closest to a target weight value, and to control the discharge of the articles from the weighing machines corresponding to the optimum combination, said combinatorial weighing method comprising the steps of:

(a) executing a combinatorial computation based on combination patterns corresponding to combinations of the weighing machines excepting combination patterns which include both weighing machines of a pair, when both weighing machines of a pair have been selected as part of the optimum combination in the previous combinatorial computation so that they have discharged their articles;

(b) selecting an optimum combination including only one weighing machine from a pair as a result of said combinatorial computation of said step (a);

(c) executing a combinatorial computation based on combination patterns including only one weighing machine from a pair, and combination patterns including only one pair with both weighing machines included in the pattern, when only one weighing machine of a pair has been selected as part of the optimum combination in the previous combinatorial computation so that it has discharged its articles; and (d) selecting one of the two weighing machines in a pair, when the optimum combination, selected as a result of the combinatorial computation of said step (c), includes both weighing machines of a single pair, executing a zero-point adjustment of the one selected weighing machine during a subsequent combinatorial computation, and executing a combinatorial computation for the weighing machines excepting at least the one weighing machine having its zero-point adjusted.

8. A combinatorial weighing method according to claim 7, wherein said step (a) includes a sub-step of excepting combination patterns including a selected one of the weighing machines in the one pair when both weighing machines in the one pair have been selected as part of the optimum combination in the previous combinatorial computation so that they have discharged their articles.

9. A combinatorial weighing method according to claim 7, wherein said step (a) includes a sub-step of excepting combination patterns including either of the weighing machines of the one pair in which both of the weighing machines have been selected as part of the optimum combination in the previous combinatorial computation so that they have discharged their articles.

10. A combinatorial weighing method according to claim 7, wherein said step (d) includes a sub-step of excepting the weighing machine which is paired with one weighing machine having its zero point adjusted.

11. A combinatorial measuring method for a computerized measuring apparatus including a plurality of pairs of weighing machines for weighing articles supplied thereto and for providing measured value data, and a computation control unit for performing a combinatorial computation to select an optimum combination of the weighing machines based on the measured value data, comprising the steps of:
   (a) generating combination patterns for combinations of the weighing machines which include no more than one weighing machine from any one pair, and combinations including a single pair in which both weighing machines are part of the combination;
   (b) computing total combined measured values on the basis of the combination patterns generated in said step (a);
   (c) selecting an optimum combination of the weighing machines which combines to provide a total combined measured value equal to or closest to a target measured value within preset limits; and
   (d) determining whether both weighing machines of a single pair have been selected as part of the optimum combination, and executing a zero point adjustment on one of the weighing machines from the single pair selected as part of the optimum combination, the weighing machine selected for the zero point adjustment being excluded from the succeeding combinatorial computation.

12. A combinatorial measuring method as set forth in claim 11, further comprising the step of executing the zero point adjustment on one of the weighing machines which has been selected as part of the optimum combination when it is determined in step (d) that there is no pair of weighing machines for which both weighing machines of the pair have been selected as part of the optimum combination, the weighing machine selected for the zero point adjustment being excluded from the succeeding combinatorial computation.

13. A combinatorial measuring method as set forth in claim 12, wherein the weighing machine which is paired with the weighing machine selected for the zero point adjustment is also excluded from the succeeding combinatorial computation.

14. A combinatorial measuring method as set forth in claim 11, wherein the weighing machine which is paired with the weighing machine selected for the zero point adjustment is also excluded from the succeeding combinatorial computation.

15. A combinatorial measuring method for a computerized measuring apparatus including a plurality of pairs of weighing machines for weighing articles supplied thereto and for providing measured value data, and a computation control unit for performing a combinatorial computation to select an optimum combination of the weighing machines based on the measured value data, comprising the steps of:
   (a) generating combination patterns which include no more than one weighing machine from any one pair;
   (b) computing the total combined measured values on the basis of the combination patterns generated in said step (a);
   (c) selecting an optimum combination of the weighing machines which combines to provide a total combined measured value equal to or closest to a target measured value within present limits;
   (d) generating combination patterns which include both weighing machine from a pair for only a single one of the pairs, when no optimum combination can be selected in said step (c);
   (e) computing the total combined measured values on the basis of the combination patterns generated in said step (d);
   (f) selecting an optimum combination of the weighing machines which combines to provide a total combined measured value equal to or closest to a target measured value within preset limits; and
   (g) executing a zero point adjustment on one of the weighing machines from the single pair of weighing machines in which both weighing machines form a part of the optimum combination determined in said step (f), the weighing machines upon which the zero point adjustment is to be executed being excluded from the succeeding combinatorial computation.

16. A combinatorial measuring method as set forth in claim 15, wherein both of the weighing machines from the single pair of weighing machines selected as part of the optimum combination in said step (f) are excluded from the succeeding combinatorial computation.

17. A combinatorial measuring method for a computerized measuring apparatus including a plurality of pairs of weighing machines for weighing articles supplied thereto and for providing measured value data, and a computation control unit for performing a combinatorial computation to select an optimum combination of the weighing machines based on the measured value data, comprising the steps of:
   (a) determining whether both weighing machines of a single pair were selected as part of the optimum combination in the previous combinatorial computation so that they have discharged their articles, and performing one of the following two sub-steps based on the result of this determination:
      ($a_1$) generating combination patterns including only one weighing machine from any one pair when it is determined that both weighing machines from a single pair were selected as part of the optimum combination in the previous combinatorial computation;
      ($a_2$) generating combination patterns which include only one weighing machine from a pair and combination patterns which include both weighing machines from a single pair when it is determined that, for the previous combinatorial computation, there were no pairs of weighing machines for which both weighing machines were selected as part of the optimum combination;
   (b) computing total combined measured values on the basis of the combination patterns generated in said sub-step ($a_1$) or said sub-step ($a_2$);

(c) selecting an optimum combination of the weighing machines which gives a total combined measured value equal to or closest to a target measured value within preset limits;
(d) executing a zero point adjustment on one of the weighing machines in a pair when both weighing machines from the pair are selected as part of the optimum combination, the weighing machine for which zero point adjustment is to be executed being excluded from the succeeding combinatorial computation.

18. A combinatorial measuring method as set forth in claim 17, wherein both weighing machines in the pair including the weighing machine for which the zero point adjustment is to be executed, are excluded from the succeeding combinatorial computation.

* * * * *

UNITED STATES PATENT AND TRADEMARK OFFICE
CERTIFICATE OF CORRECTION

PATENT NO. : 4,618,011
DATED : OCTOBER 21, 1986
INVENTOR(S) : TAKASHI SASHIKI ET AL.

It is certified that error appears in the above-identified patent and that said Letters Patent is hereby corrected as shown below:

FRONT PAGE [57] ABSTRACT, line 4, "those" should be --a--;
line 5, "a" should be --those--.

Col. 2, line 59, delete "the".

Col. 3, line 46, after "According" insert --to--.

Col. 4, line 46, "combination" should be --combinations--.

Col. 6, line 13, after "practicing" insert --zero-point--.

Col. 8, line 58, after "combinations" insert --for--.

Col. 9, line 49, "FG" should be --G--; and after "flags" (second occurrence) insert --F--.

Col. 10, line 5, "7:" should be --107:--;
line 68, "he" should be --the--.

Col. 11, line 13, delete "the" (first occurrence).

Col. 13, line 20, "pattern: the" should be --patterns,--.

Col. 14, line 68, "Contrast" should be --In contrast--.

Col. 15, line 34, "nonpartipating" should be --nonparticipating--;
line 37, "cal" should be --ced--.

UNITED STATES PATENT AND TRADEMARK OFFICE
CERTIFICATE OF CORRECTION

PATENT NO. : 4,618,011

DATED : OCTOBER 21, 1986

INVENTOR(S) : TAKASHI SASHIKI ET AL.

It is certified that error appears in the above-identified patent and that said Letters Patent is hereby corrected as shown below:

Col. 17, line 27, delete "of the"; and after "doubling" insert --of the--;
line 57, "at H and" should be --at "H"--.

Col. 19, line 60, "doubling" should be --doubling.--;
line 65, delete "all" (second occurrence).

Col. 20, line 3, "doubling in" should be --doubling.--;
line 53, delete "to.";
line 55, "take" should be --takes--.

Col. 21, line 67, after "only" insert --the--; and "without the" should be --without--.

Col. 22, line 7, "to" should be --and--;
line 17, "the" (second occurrence) should be --an--; and "an" should be --the--;
line 64, after "they" insert --have--.

*Col. 23, line 5, "binatoiral" should be --binatorial--;
line 45, "P" should be --$P_i$--.

Col. 24, line 21, "increased" should be --increased, thereby--;
line 37, "whem" should be --when--;
line 43, "reduced" should be --reduced, thereby--;
line 50, "combination" should be --combination.--;
line 51, "as" should be --As--; and "result" should be --result,--;
line 56, delete "to";
line 57, "computation" should be --computations--.

UNITED STATES PATENT AND TRADEMARK OFFICE
CERTIFICATE OF CORRECTION

PATENT NO. : 4,618,011
DATED : OCTOBER 21, 1986
INVENTOR(S) : TAKASHI SASHIKI ET AL.

It is certified that error appears in the above-identified patent and that said Letters Patent is hereby corrected as shown below:

Col. 25, line 18, after "(c)" insert --executing--.

Col. 28, line 28, "machines" should be --machine--.

Signed and Sealed this

Seventeenth Day of March, 1987

Attest:

DONALD J. QUIGG

Attesting Officer

Commissioner of Patents and Trademarks